US011943745B2

(12) United States Patent
Zhang

(10) Patent No.: US 11,943,745 B2
(45) Date of Patent: Mar. 26, 2024

(54) METHOD AND DEVICE FOR SIDELINK WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 344 days.

(21) Appl. No.: 17/458,585

(22) Filed: Aug. 27, 2021

(65) Prior Publication Data

US 2022/0070827 A1    Mar. 3, 2022

(30) Foreign Application Priority Data

Aug. 28, 2020   (CN) .......................... 202010889198.9

(51) Int. Cl.
| | | |
|---|---|---|
| *H04W 72/02* | (2009.01) | |
| *H04W 4/00* | (2018.01) | |
| *H04W 24/04* | (2009.01) | |
| *H04W 36/00* | (2009.01) | |
| *H04W 36/30* | (2009.01) | |
| *H04W 72/0446* | (2023.01) | |
| *H04W 72/0453* | (2023.01) | |
| *H04W 72/20* | (2023.01) | |
| *H04W 76/19* | (2018.01) | |
| *H04W 76/23* | (2018.01) | |
| *H04W 80/02* | (2009.01) | |

(52) U.S. Cl.
CPC ....... *H04W 72/02* (2013.01); *H04W 72/0446* (2013.01); *H04W 72/0453* (2013.01); *H04W 72/20* (2023.01); *H04W 80/02* (2013.01)

(58) Field of Classification Search
CPC . H04W 72/02; H04W 72/20; H04W 72/0446; H04W 72/0453; H04W 80/02
See application file for complete search history.

(56) References Cited

U.S. PATENT DOCUMENTS

| | | | | |
|---|---|---|---|---|
| 10,721,787 | B2* | 7/2020 | Chen | H04W 76/14 |
| 2015/0124646 | A1* | 5/2015 | Yun | H04L 67/1051 |
| | | | | 370/254 |
| 2016/0094446 | A1* | 3/2016 | Kazmi | H04W 28/0289 |
| | | | | 370/392 |
| 2016/0338092 | A1* | 11/2016 | Agiwal | H04W 72/25 |
| 2017/0034862 | A1* | 2/2017 | Ma | H04W 76/14 |
| 2017/0331577 | A1* | 11/2017 | Parkvall | H04J 11/0079 |

(Continued)

*Primary Examiner* — Jenee Holland

(57) ABSTRACT

A method and a device for sidelink wireless communications are disclosed by the present disclosure. A first node receives a third radio signal and a first radio signal set, the third radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying the third radio signal's transmitter; the first parameter set is used for configuring RB of the first node; a transmitter of the first radio signal set is identified by one of the Q node IDs; or transmitters of Q1 radio signals in the first radio signal set are respectively identified by Q1 node IDs out of the Q node IDs.

20 Claims, 5 Drawing Sheets

(56) References Cited

U.S. PATENT DOCUMENTS

| | | | |
|---|---|---|---|
| 2019/0149365 A1* | 5/2019 | Chatterjee | H04L 5/0094 |
| | | | 370/329 |
| 2020/0137614 A1* | 4/2020 | Hampel | H04W 76/11 |
| 2021/0219105 A1* | 7/2021 | Fan | H04W 4/40 |
| 2021/0258819 A1* | 8/2021 | Wu | H04L 69/321 |
| 2022/0078825 A1* | 3/2022 | Davydov | H04L 5/0007 |
| 2022/0095388 A1* | 3/2022 | Sosnin | H04W 74/0866 |
| 2022/0110112 A1* | 4/2022 | Wei | H04W 72/0453 |
| 2022/0183049 A1* | 6/2022 | Lee | H04W 76/20 |

\* cited by examiner

METHOD AND DEVICE FOR SIDELINK WIRELESS COMMUNICATION

CROSS REFERENCE TO RELATED APPLICATIONS

This application claims the priority benefit of Chinese Patent Application No. 202010889198.9, filed on Aug. 28, 2020, the full disclosure of which is incorporated herein by reference.

BACKGROUND

Technical Field

The present disclosure relates to methods and devices in wireless communication systems, and in particular to a method and a device supporting relayed transmission in wireless communications in sidelink.

Related Art

As a multi-hop transmission technology, Relay is aimed at increasing cell-edge throughput and cell coverage. Take Sidelink (SL) transmission in a Long Term Evolution (LTE) system as an example, a transmission from a User Equipment (UE) to a relay node (RN) adopts SL Radio technique, while a transmission from an RN to a base station (that is, eNodeB, eNB) adopts LTE Radio technique. The RN being used for data forwarding between the UE and the eNB is also called Internet Protocol (IP) layer forwarding or Layer 3 Relay/L3 Relay.

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR. In response to rapidly growing Vehicle-to-Everything (V2X) traffic, 3GPP has started standards setting and research work for SL under the framework of NR. At the 3GPP RAN #86 Plenary, a decision was made on starting a Study Item (SI) to standardize NR SL Relay.

SUMMARY

Inventors find through researches that by introducing a relay node in SL transmission, the end-to-end transmission quality can be improved, thus enhancing the wireless coverage. Since the vehicle in NR V2X scenarios is always in a rapidly moving state, the channel status of a single relay link is not necessarily sufficient to fulfill service requests. Under such a circumstance, the relay link is required to be switched to a new one, so, how to achieve a swift handover between relay links has to be further studied.

To address the above problem, the present disclosure discloses a solution. Although the statement above only described a typical scenario of NR V2X for example, the present disclosure is also applicable to other scenarios apart from NR V2X confronting similar issues, such as a relay network, a Device-to-Device (D2D) network, a cellular network or any scenario supporting Half-Duplex UE, where technical effects similar to those in the NR V2X scenarios will be achieved. Additionally, the adoption of a unified solution for various scenarios (including but not limited to NR V2X scenario and downlink communications) contributes to the reduction of hardcore complexity and costs. It should be noted that the embodiments of the first node of the present disclosure and the characteristics in the embodiments may be applied to any other node if no conflict is incurred, and vice versa. In the case of no conflict, the embodiments of the present disclosure and the characteristics in the embodiments may be combined with each other arbitrarily. Particularly, for interpretations of the terminology, nouns, functions, and variants (unless otherwise specified) in the present disclosure, refer to definitions given in TS36 series, TS38 series and TS37 series of 3GPP specifications.

The present disclosure provides a method in a first node for wireless communications, comprising:
 receiving a third radio signal and a first radio signal set, the third radio signal comprising first information;
 herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC Service Data Unit (SDU) set, and the first parameter set is applicable to the first MAC SDU set.

In one embodiment, the present disclosure is applicable to scenarios supporting configurations of multiple relay nodes in SL wireless transmissions.

In one embodiment, a problem to be solved in the present disclosure is how to recover end-to-end communication in the case of reducing communication quality resulting from the UE mobility and degradation of channel status.

In one embodiment, a scheme proposed by the present disclosure comprises: providing support for configuring multiple relay nodes for a UE as candidate relay nodes and configuring multiple end-to-end radio links that go through these relay nodes with a same Bearer and higher-layer processing entity; upon reception of data sent from any relay node the UE performs the same higher-layer processing.

In one embodiment, a beneficial effect of the present disclosure includes: when one relay node is not available, it can be switched to other available relay nodes as quickly as possible, hence no need for reconfiguration of the UE, and a fast radio link handover can be achieved; synchronous forwarding by multiple relay nodes can lead to an enhancement in the robustness and throughput rate of data transmission.

According to one aspect of the present disclosure, comprising:
 transmitting a fifth radio signal as a response to the first information, the fifth radio signal comprising second information;
 herein, a target receiver of the fifth radio signal is a transmitter of the third radio signal.

According to one aspect of the present disclosure, comprising:
 monitoring a corresponding physical layer signaling for each node ID of the Q node IDs in a first time-frequency resource pool;

herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

According to one aspect of the present disclosure, comprising:

transmitting third information, the third information comprising a discovery message;

receiving a fourth information set, and determining P candidate node IDs according to the fourth information set;

transmitting a seventh radio signal, the seventh radio signal comprising fifth information, the fifth information comprising the P candidate node IDs;

herein, any piece of information in the fourth information set comprises a response to the third information; the P candidate node IDs comprise the Q node IDs; P is a positive integer no less than Q.

According to one aspect of the present disclosure, comprising:

determining a first radio link failure; and as a response to the first radio link failure, transmitting a ninth radio signal, the ninth radio signal comprising sixth information, the sixth information indicating the first radio link failure;

herein, the Q node IDs comprise a first node ID; the first radio link comprises a node identified by the first node ID; a target receiver of the ninth radio signal comprises a node identified by one of the Q node IDs other than the first node ID.

According to one aspect of the present disclosure, comprising:

for any MAC SDU comprised by the first MAC SDU set, distributing the MAC SDU to a target RLC entity of the first node according to a LCID of the MAC SDU;

herein, the target RLC entity of the first node is unrelated to a node ID of a transmitter of the MAC SDU.

The present disclosure provides a method in a second node for wireless communications, comprising:

transmitting a fourth radio signal and a second radio signal set, the fourth radio signal comprising first information;

herein, the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC SDU set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q.

According to one aspect of the present disclosure, comprising:

receiving a sixth radio signal, the sixth radio signal comprising second information;

herein, the second information comprises a response to the first information; a transmitter of the sixth radio signal is a target receiver of the fourth radio signal.

According to one aspect of the present disclosure, comprising:

a corresponding physical layer signaling for each node ID of the Q node IDs is monitored in a first time-frequency resource pool;

herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

According to one aspect of the present disclosure, comprising:

receiving an eighth radio signal, the eighth radio signal comprising fifth information, the fifth information comprising P candidate node IDs;

herein, the P candidate node IDs comprise the Q node IDs; P is a positive integer no less than Q.

According to one aspect of the present disclosure, comprising:

receiving a tenth radio signal, the tenth radio signal comprising sixth information;

herein, the sixth information indicates a first radio link failure; the Q node IDs comprise a first node ID; the first radio link comprises a node identified by the first node ID; a transmitter of the tenth radio signal comprises a node identified by one of the Q node IDs other than the first node ID.

According to one aspect of the present disclosure, comprising:

any MAC SDU comprised by the first MAC SDU set is from an RLC entity of the second node, any two said MAC SDUs share a same LCID;

herein, the RLC entity of the second node is unrelated to a node ID of a receiver of the MAC SDU.

According to one aspect of the present disclosure, comprising:

transmitting an eighth information set, the eighth information set comprising a second configuration, the second configuration comprising a second parameter set;

herein, the second parameter set is used for configuring RLC Bearers for Q nodes identified by the Q node IDs.

The present disclosure provides a method in a third node for wireless communications, comprising:

receiving a fourth radio signal and an eleventh radio signal, the eleventh radio signal belonging to a second radio signal set;

transmitting a third radio signal and a twelfth radio signal, the twelfth radio signal belonging to a first radio signal set;

herein, the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC SDU set, and the first parameter set is applicable to the first MAC SDU set.

According to one aspect of the present disclosure, comprising:
  receiving a fifth radio signal;
  transmitting a sixth radio signal;
  herein, the fifth radio signal and the sixth radio signal respectively comprise second information; the second information comprises a response to the first information.

According to one aspect of the present disclosure, comprising:
  a corresponding physical layer signaling for each node ID of the Q node IDs is monitored in a first time-frequency resource pool;
  herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

According to one aspect of the present disclosure, comprising:
  receiving third information and a seventh radio signal, the third information comprising a discovery message;
  transmitting seventh information and an eighth radio signal, the seventh information belonging to a fourth information set;
  herein, the fourth information set is used for determining P candidate node IDs; the seventh information comprises a response to the third information; the seventh radio signal and the eighth radio signal respectively comprise fifth information, the fifth information comprising the P candidate node IDs; the P candidate node IDs comprise the Q node IDs; P is a positive integer no less than Q.

According to one aspect of the present disclosure, comprising:
  receiving a ninth radio signal; and
  transmitting a tenth radio signal;
  herein, the ninth radio signal and the tenth radio signal respectively comprise sixth information, the sixth information indicating a first radio link failure; the Q node IDs comprise a first node ID; the first radio link comprises a node identified by the first node ID; the third node is a node identified by one of the Q node IDs other than the first node ID.

According to one aspect of the present disclosure, comprising:
  for a first MAC SDU comprised by the eleventh radio signal, the first MAC SDU is distributed to an RLC entity of the third node according to an LCD of the first MAC SDU; the first MAC SDU is used for generating the twelfth radio signal;
  herein, the RLC entity of the third node buffers the first MAC SDU; the first MAC SDU belongs to the first MAC SDU set.

According to one aspect of the present disclosure, comprising:
  receiving ninth information, the ninth information belonging to an eighth information set; the ninth information comprising a second configuration, the second configuration comprising a second parameter set;
  herein, the second parameter set is used for configuring RLC Bearers for the third node.

The present disclosure provides a first node for wireless communications, comprising:
  a first receiver, receiving a third radio signal and a first radio signal set, the third radio signal comprising first information;
  herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC SDU set, and the first parameter set is applicable to the first MAC SDU set.

The present disclosure provides a second node for wireless communications, comprising:
  a second transmitter, transmitting a fourth radio signal and a second radio signal set, the fourth radio signal comprising first information;
  herein, the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC SDU set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q.

The present disclosure provides a third node for wireless communications, comprising:
  a third receiver, receiving a fourth radio signal and an eleventh radio signal, the eleventh radio signal belonging to a second radio signal set;
  a third transmitter, transmitting a third radio signal and a twelfth radio signal, the twelfth radio signal belonging to a first radio signal set;
  herein, the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC SDU set, and the first parameter set is applicable to the first MAC SDU set.

In one embodiment, the method provided in the present disclosure has the following advantages:
  the present disclosure is applicable to scenarios supporting configuring multiple relay nodes in sidelink wireless transmission;

the issue remaining to be solved in the present disclosure is how to achieve quick recovery of peer-to-peer communications when confronting a reduction in the communication quality caused by the degradation of channel status or UE mobility;

the method in the present disclosure is adopted to support multiple relay nodes being configured as candidate relay nodes for a UE, and to configure multiple end-to-end radio links through these relay nodes with the same bearer and higher-layer processing entity; therefore, upon reception of data sent by any of the relay nodes a UE is capable of the same higher-layer processing;

the method in the present disclosure is adopted to ensure that once there is a relay node that does not work, it can be switched as soon as possible to another one to avoid extra UE reconfiguration, thus realizing a quick radio link handover; in the meantime, forwarding through multiple relay nodes can help enhance both the robustness and throughput of data transmission.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
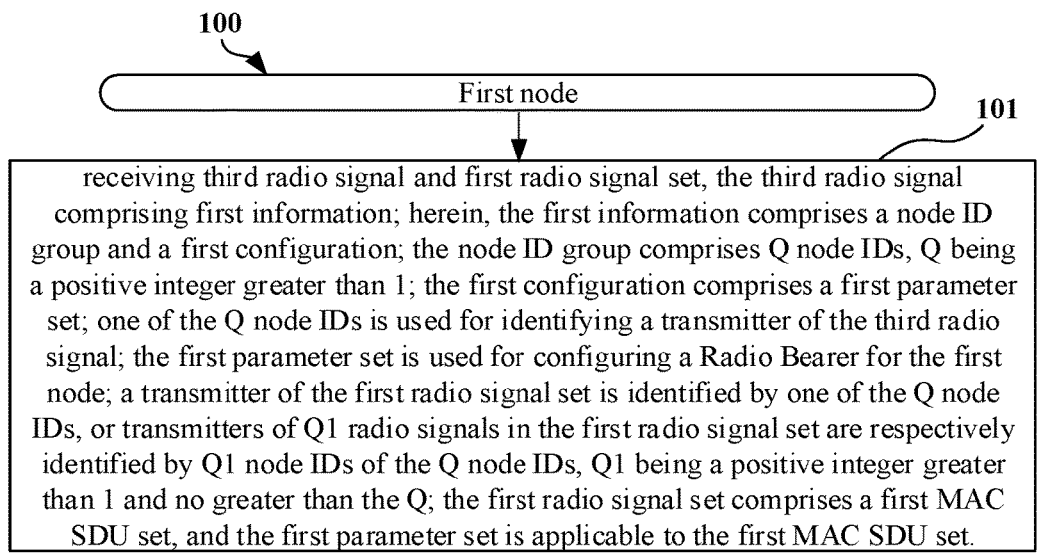
FIG. 1 illustrates a flowchart of a third radio signal and a first radio signal set according to one embodiment of the present disclosure.

Embodiment 1 illustrates a flowchart of a third radio signal and a first radio signal set according to one embodiment of the present disclosure, as shown in FIG. 1.

In Embodiment 1, the first node 100 in the present disclosure receives a third radio signal and a first radio signal set in step 101, the third radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC SDU set, and the first parameter set is applicable to the first MAC SDU set.

In one embodiment, the first node receives a third radio signal and a first radio signal set.

In one embodiment, a transmitter of the third radio signal is the third node in the present disclosure.

In one embodiment, the third radio signal is transmitted through a PC5 interface.

In one embodiment, the third radio signal is transmitted through SL.

In one embodiment, the third radio signal is a Physical Sidelink Shared Channel (P S SCH).

In one embodiment, the third radio signal is transmitted through a SL-Signaling Radio Bearer (SL-SRB).

In one embodiment, the third radio signal is transmitted through a SL-SRB3.

In one embodiment, time-frequency resources occupied by the third radio signal belong to a V2X resource pool.

In one embodiment, time-frequency resources occupied by the third radio signal are reserved for sidelink transmission.

In one embodiment, the first radio signal set are transmitted by a transmitter.

In one embodiment, the first radio signal set comprises at least two radio signals; and the at least two radio signals in the first radio signal set are transmitted by different transmitters.

In one embodiment, the first radio signal set comprises at least one radio signal.

In one embodiment, the first radio signal set comprises the twelfth radio signal.

In one embodiment, the first radio signal set is transmitted via a radio interface.

In one embodiment, the first radio signal set is transmitted via a PC5 interface.

In one embodiment, the first radio signal set is transmitted through SL.

In one embodiment, any radio signal in the first radio signal set occupies a PSSCH.

In one embodiment, any radio signal in the first radio signal set occupies a physical layer channel.

In one embodiment, any radio signal in the first radio signal set is transmitted through a Data Radio Bearer (DRB).

In one embodiment, the first radio signal set comprises at least two radio signals; and any two radio signals in the first radio signal set are received in different sidelink slots.

In one embodiment, the first radio signal set comprises at least two radio signals; and at least two radio signals in the first radio signal set are received in a same sidelink slot.

In one embodiment, the first radio signal set comprises at least two radio signals; and any two radio signals in the first radio signal set carry different information bits.

In one embodiment, the first radio signal set comprises at least two radio signals; and any two radio signals in the first radio signal set carry different Transport Blocks (TBs).

In one embodiment, time-frequency resources occupied by the first radio signal set belong to a V2X resource pool.

In one embodiment, time-frequency resources occupied by the first radio signal set are reserved for sidelink transmission.

In one embodiment, the third radio signal and any radio signal comprised in the first radio signal set are received in different sidelink slots.

In one embodiment, the first information comprises Radio Resource Control (RRC) information.

In one embodiment, the first information comprises PC5-RRC information.

In one embodiment, the first information comprises all or part of Information Elements (IEs) in a piece of RRC information.

In one embodiment, the first information comprises all or part of fields of an IE in a piece of RRC information.

In one embodiment, the first information comprises RRCReconfigurationSidelink.

In one embodiment, the first information comprises RRCReconfigurationResponseSidelink.

In one embodiment, the first information comprises RRCReconfigurationRequestSidelink.

In one embodiment, the first information comprises SL-ConfigDedicatedNR.

In one embodiment, the first information comprises PC5-Signaling (PC5-S) information.

In one embodiment, the first information is processed by higher layer protocols to generate a first bit block.

In one embodiment, all or part of the first bit block is used to generate the third radio signal.

In one embodiment, all or part of the first bit block is used together with a reference signal to generate the third radio signal.

In one embodiment, the third radio signal is obtained by all or part of bits in the first bit block sequentially through CRC Calculation, Channel Coding, Rate matching, Scrambling, and Modulation, Layer Mapping, Antenna Port Mapping, Mapping to Virtual Resource Blocks, and Mapping from Virtual to Physical Resource Blocks, OFDM Baseband Signal Generation and Modulation and Up conversion.

In one embodiment, the first information comprises a node ID group and a first configuration.

In one embodiment, the node ID group is a field in the first information.

In one embodiment, the node ID group is a RelayList field in the first information.

In one embodiment, the node ID group is a SL-RelayList field in the first information.

In one embodiment, the node ID group comprises Q node IDs, Q being a positive integer greater than 1 and no greater than 64.

In one embodiment, the number of bits comprised by any of the Q node IDs is a positive integral multiple of 8.

In one embodiment, the number of bits comprised by any of the Q node IDs is 8.

In one embodiment, the number of bits comprised by any of the Q node IDs is 24.

In one embodiment, any of the Q node IDs is a link layer ID.

In one embodiment, any of the Q node IDs is a Layer 2 Identity.

In one embodiment, the Q node IDs respectively indicate Q relay nodes.

In one embodiment, any of the Q node IDs indicates a node.

In one embodiment, a transmitter of the third radio signal comprises a node identified by a node ID out of the Q node IDs; the third radio signal comprises part of bits in the said node ID; scheduling information of the third radio signal comprises the remaining part of bits in the said node ID.

In one embodiment, a transmitter of the third radio signal comprises a node identified by a node ID out of the Q node IDs; the third radio signal comprises upper 16 bits in the said node ID; scheduling information of the third radio signal comprises lower 8 bits in the said node ID.

In one embodiment, the scheduling information of the third radio signal is comprised in a physical layer signaling.

In one embodiment, the scheduling information of the third radio signal comprises Sidelink Control Information (SCI).

In one embodiment, the first configuration is a field in the first information.

In one embodiment, the first configuration is a SLRB-Config field in the first information.

In one embodiment, the first configuration is a slrb-ConfigToAddModList field in the first information.

In one embodiment, the first parameter set comprises at least one of a Service Data Adaptation Protocol (SDAP) configuration parameter, a Packet Data Convergence Protocol (PDCP) configuration parameter, a Radio Link Control (RLC) configuration parameter, or a Medium Access Control (MAC) configuration parameter.

In one embodiment, the first parameter set is used for configuring a Radio Bearer for the first node.

In one embodiment, the Radio Bearer for the first node is bi-directional.

In one embodiment, the first parameter set comprises a first radio bearer ID, the first radio bearer ID indicating the Radio Bearer for the first node.

In one embodiment, the first radio bearer ID indicates a Peer-to-Peer radio bearer.

In one embodiment, the first parameter set comprises an LCID corresponding to the Radio Bearer for the first node.

In one embodiment, the Radio Bearer for the first node corresponds to a higher layer entity of the first node.

In one embodiment, the LCID corresponding to the Radio Bearer for the first node is used to determine a higher layer entity processing a packet that belongs to the Radio Bearer.

In one embodiment, the LCID corresponding to the Radio Bearer for the first node is used to determine an RLC entity processing a MAC SDU that belongs to the Radio Bearer.

In one embodiment, the first parameter set is used for configuring the higher layer entity corresponding to the Radio Bearer for the first node.

In one embodiment, the higher layer entity corresponding to the Radio Bearer for the first node comprises at least one of an SDAP entity, a PDCP entity, an RLC entity or a MAC entity.

In one embodiment, the Radio Bearer for the first node is used for transmitting traffics to which the first MAC SDU set belongs.

In one embodiment, the Radio Bearer for the first node is used for transmitting Quality of Service (QoS) streams to which the first MAC SDU set belongs.

In one embodiment, the Radio Bearer for the first node is used for transmitting PC5 QoS streams to which the first MAC SDU set belongs.

In one embodiment, the Radio Bearer for the first node is a DRB.

In one embodiment, the Radio Bearer for the first node is a SL-SRB.

In one embodiment, the Radio Bearer for the first node is a SL-RLC Bearer.

In one embodiment, the Radio Bearer for the first node is a PDCP Bearer.

In one embodiment, the Radio Bearer for the first node is an SDAP Bearer.

In one embodiment, the first parameter set is applicable to the first MAC SDU set.

In one embodiment, the first MAC SDU set is processed in the SDAP entity, the PDCP entity and the RLC entity of the first node.

In one embodiment, the first MAC SDU set is processed in the PDCP entity and the RLC entity of the first node.

In one embodiment, a transmitter of the first radio signal set is identified by one of the Q node IDs.

In one embodiment, a transmitter of the first radio signal set and a transmitter of the third radio signal are identified by a same node ID of the Q node IDs.

In one embodiment, a transmitter of any radio signal in the first radio signal set is identified by a node ID of the Q node IDs; the said radio signal comprises part of bits in the said node ID; scheduling information of the said radio signal comprises the remaining part of bits in the said node ID; the scheduling information of the said radio signal comprises SCI.

In one embodiment, transmitters of Q1 radio signals in the first radio signal set are respectively identified by Q1 node IDs of the Q node IDs; any two of the Q1 node IDs are different.

In one embodiment, any two radio signals of the Q1 radio signals in the first radio signal set are received in different sidelink slots.

In one embodiment, at least two radio signals of the Q1 radio signals in the first radio signal set are received in a same sidelink slot.

In one embodiment, a transmitter that transmits any radio signal in the first radio signal set other than the Q1 radio signals is identified by a node ID of the Q node IDs other than the Q1 node IDs.

In one embodiment, a transmitter that transmits at least one radio signal in the first radio signal set other than the Q1 radio signals is identified by one of the Q1 node IDs of the Q node IDs.

In one embodiment, the first radio signal set comprises a first MAC SDU set.

In one embodiment, the first MAC SDU set comprises at least one MAC SDU.

In one embodiment, the first radio signal set comprises at least two radio signals; and any two radio signals in the first radio signal set comprise different MAC SDUs.

In one embodiment, the first radio signal set comprises at least two radio signals; and at least two radio signals in the first radio signal set comprise a same MAC SDU.

Embodiment 2

Figure 2:
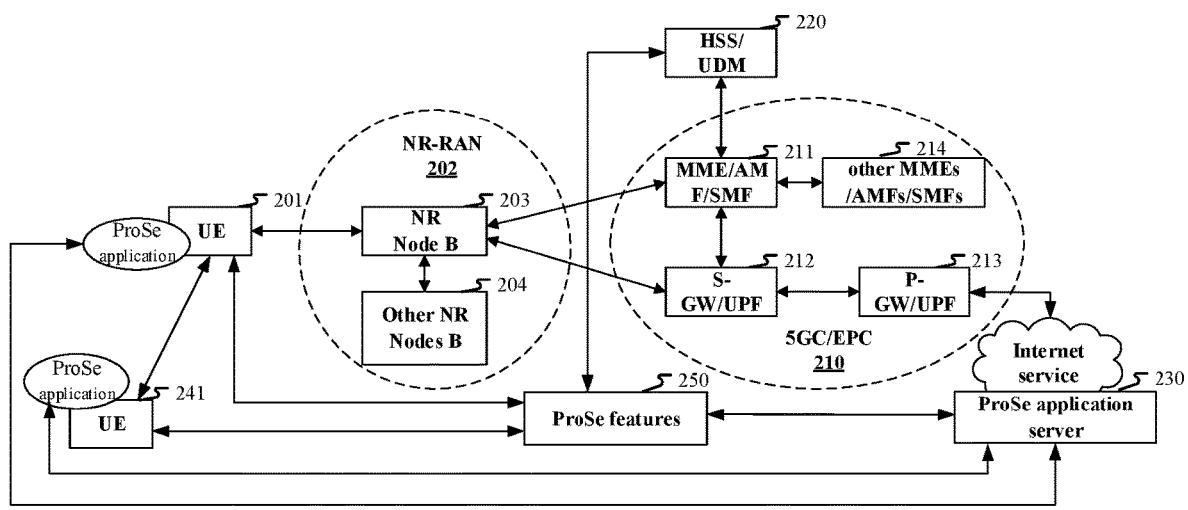
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of NR 5G, Long-Term Evolution (LTE), and Long-Term Evolution Advanced (LTE-A) systems. The NR 5G or LTE, or LTE-A network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 corresponds to the first node in the present disclosure, and the UE 241 corresponds to the third node in the present disclosure.

In one embodiment, the UE 201 corresponds to the second node in the present disclosure, and the UE 241 corresponds to the third node in the present disclosure.

In one embodiment, the UE 201 and the UE 241 respectively support transmissions in SL.

In one embodiment, the UE 201 and the UE 241 respectively support PC5 interfaces.

In one embodiment, the UE 201 and the UE 241 respectively support Vehicle-to-Everything (V2X).

In one embodiment, the UE 201 and the UE 241 respectively support V2X services.

In one embodiment, the UE 201 and the UE 241 respectively support D2D services.

In one embodiment, the UE 201 and the UE 241 respectively support public safety services.

In one embodiment, the gNB 203 supports Vehicle-to-Everything (V2X).

In one embodiment, the gNB 203 supports V2X services.

In one embodiment, the gNB 203 supports D2D services.

In one embodiment, the gNB 203 supports public safety services.

In one embodiment, the gNB 203 is a Macro Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station supporting large time-delay difference.

In one embodiment, the gNB 203 is a flight platform.

In one embodiment, the gNB 203 is satellite equipment.

In one embodiment, a radio link from the UE 201 to the gNB 203 is uplink.

In one embodiment, a radio link from the gNB 203 to the UE 201 is downlink.

In one embodiment, a radio link between the UE 201 and the UE 241 corresponds to the sidelink in the present disclosure.

In one embodiment, the UE 201 and the gNB 203 are connected by a Uu interface.

In one embodiment, the UE 201 and the UE 241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is respectively connected to the ProSe applications of the UE 201 and the UE 241 by PC1 Reference Points.

Embodiment 3

Figure 3:
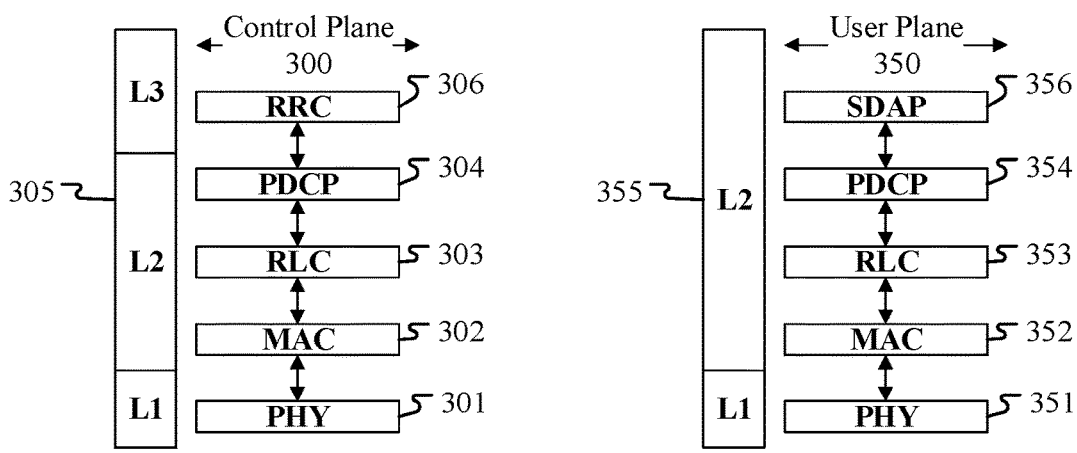
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through ARQ, and detection of duplicate packets and protocol errors. The MAC sublayer 302 provides mappings between a logical channel and a transport channel as well as multiplexing of logical channel ID. The MAC sublayer 302 is also responsible for allocating between UEs various radio resources (i.e., resource block) in a cell. The MAC sublayer 302 is also in charge of Hybrid Automatic Repeat Request (HARM) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. Although not shown in the figure, above the RRC sublayer 306 in the control plane 300 of the UE there can be a V2X layer, which is in charge of generating a PC5 QoS parameter group and a QoS rule according to received traffic data or traffic requests, generating a PC5 QoS flow corresponding to the PC5 QoS parameter group and sending a PC5 QoS flow ID and the corresponding PC5 QoS parameter group to a Access Stratum (AS) to be used for QoS processing of a packet that belongs to the PC5 QoS flow ID; the V2X layer is also responsible for indicating whether each transmission in the AS layer is a PC5-Signaling (PC5-S) Protocol transmission or a V2X traffic data transmission. The radio protocol architecture of the user plane 350 comprises a layer 1 (L1) and a layer 2 (L2). In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the ninth radio signal in the present disclosure is generated by the PHY 301 or the PHY 351.

In one embodiment, the tenth radio signal in the present disclosure is generated by the PHY 301 or the PHY 351.

In one embodiment, the eleventh radio signal in the present disclosure is generated by the PHY 301 or the PHY 351.

In one embodiment, the twelfth radio signal in the present disclosure is generated by the PHY 301 or the PHY 351.

In one embodiment, the first information in the present disclosure is generated by the RRC 306.

In one embodiment, the first information in the present disclosure is generated by the PC5-S.

In one embodiment, the second information in the present disclosure is generated by the RRC 306.

In one embodiment, the second information in the present disclosure is generated by the PC5-S.

In one embodiment, the third information in the present disclosure is generated by the RRC 306.

In one embodiment, the third information in the present disclosure is generated by the PC5-S.

In one embodiment, the fourth information set in the present disclosure is generated by the RRC 306.

In one embodiment, the fourth information set in the present disclosure is generated by the PC5-S.

In one embodiment, the fifth information in the present disclosure is generated by the RRC 306.

In one embodiment, the fifth information in the present disclosure is generated by the PC5-S.

In one embodiment, the sixth information in the present disclosure is generated by the RRC 306.

In one embodiment, the sixth information in the present disclosure is generated by the PC5-S.

In one embodiment, the seventh information in the present disclosure is generated by the RRC 306.

In one embodiment, the seventh information in the present disclosure is generated by the PC5-S.

In one embodiment, the eighth information set in the present disclosure is generated by the RRC 306.

In one embodiment, the eighth information set in the present disclosure is generated by the PC5-S.

In one embodiment, the ninth information in the present disclosure is generated by the RRC 306.

In one embodiment, the ninth information in the present disclosure is generated by the PC5-S.

In one embodiment, the L2 305 belongs to a higher layer.

In one embodiment, the RRC sublayer 306 in the L3 belongs to a higher layer.

In one embodiment, the V2X layer belongs to a Non-Access Stratum (NAS).

In one embodiment, the V2X layer belongs to an upper layer.

In one embodiment, the PC5-S in the V2X layer belongs to an upper layer.

Embodiment 4

Figure 4:
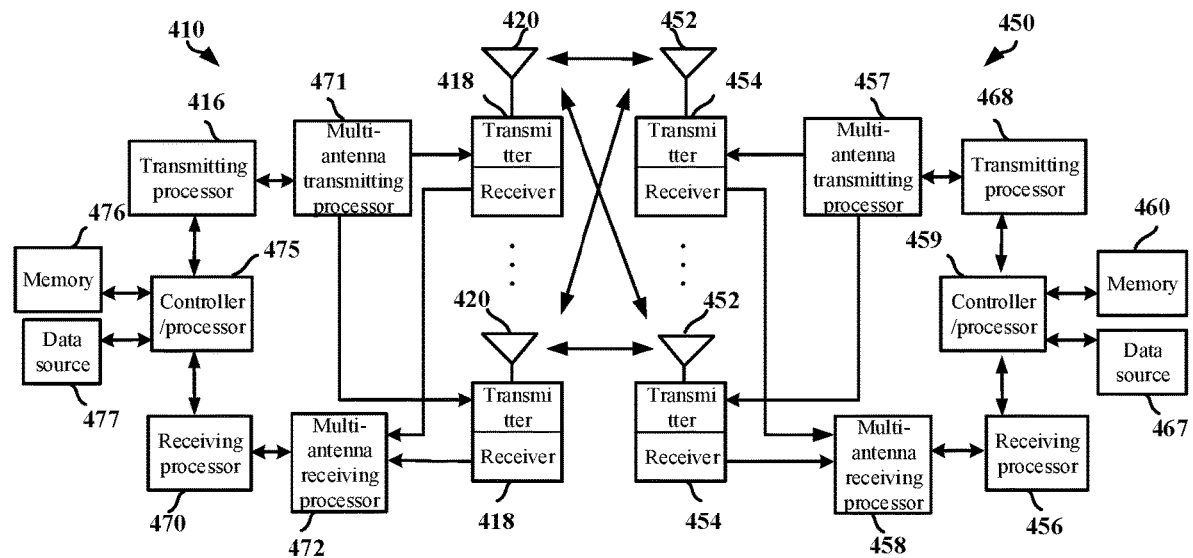
FIG. 4 illustrates a schematic diagram of hardcore modules in a communication device according to one embodiment of the present disclosure.

Embodiment 4 illustrates a schematic diagram of hardcore modules in a communication device according to one embodiment of the present disclosure, as shown in FIG. 4.

FIG. 4 is a block diagram of a first communication device 450 and a third communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The third communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the third communication device 410 to the first communication device 450, at the third communication device 410, a higher layer packet from a core network or a data source 477 is provided to the controller/processor 475. The core network and the data source 477 represent all protocol layers above the L2. The controller/processor 475 implements the functionality of the L2 layer. In the transmission from the third communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the third communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the third communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the third communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the third communication device 410 to the first communication device 450, the controller/processor 459 provides demultiplexing between a transport channel and a logical channel, packet reassembling, decrypting, header decompression and control signal processing so as to recover a higher-layer packet from the third communication device 410. The higher-layer packet is later provided to all protocol layers above the L2 layer, or various control signals can be provided to the L3 layer for processing.

In a transmission from the first communication device 450 to the third communication device 410, at the first communication device 450, the data source 467 is configured to provide a higher-layer packet to the controller/processor 459. The data source 467 represents all protocol layers above the L2 layer. Similar to a transmitting function of the third communication device 410 described in the transmission from the third communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the third communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the third communication device 410, the function of the third communication device 410 is similar to the receiving function of the first communication device 450 described in the transmission from the third communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the third communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network, or all protocol layers above the L2, or, various control signals can be provided to the core network or L3 for processing.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a third radio signal and a first radio signal set, the third radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC Service Data Unit (SDU) set, and the first parameter set is applicable to the first MAC SDU set.

In one embodiment, the first communication device 450 comprises a memory that stores a computer readable instruction program. The computer readable instruction program generates actions when executed by at least one processor. The actions include: receiving a third radio signal and a first radio signal set, the third radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC Service Data Unit (SDU) set, and the first parameter set is applicable to the first MAC SDU set.

In one embodiment, the third communication device 410 comprises at least one processor and at least one memory. The at least one memory comprises computer program codes; the at least one memory and the computer program codes are configured to be used in collaboration with the at least one processor. The third communication device 410 at least receives a fourth radio signal and an eleventh radio signal, the eleventh radio signal belonging to a second radio signal set; transmits a third radio signal and a twelfth radio signal, the twelfth radio signal belonging to a first radio signal set; herein, the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC SDU set, and the first parameter set is applicable to the first MAC SDU set.

In one embodiment, the third communication device 410 comprises a memory that stores a computer readable instruction program. The computer readable instruction program generates actions when executed by at least one processor. The actions include: receiving a fourth radio signal and an eleventh radio signal, the eleventh radio signal belonging to a second radio signal set; transmitting a third radio signal and a twelfth radio signal, the twelfth radio signal belonging to a first radio signal set; herein, the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC SDU set, and the first parameter set is applicable to the first MAC SDU set.

In one embodiment, the first communication device 450 corresponds to a first node in the present disclosure.

In one embodiment, the third communication device 410 corresponds to a third node in the present disclosure.

In one embodiment, the first communication device 450 is a UE.

In one embodiment, the first communication device 450 is a UE supporting V2X.

In one embodiment, the first communication device 450 is a UE supporting D2D.

In one embodiment, the first communication device 450 is vehicle-mounted equipment.

In one embodiment, the first communication device 450 is an RSU.

In one embodiment, the third communication device 410 is a UE.

In one embodiment, the third communication device 410 is a UE supporting V2X.

In one embodiment, the third communication device 410 is a UE supporting D2D.

In one embodiment, the third communication device 410 is vehicle-mounted equipment.

In one embodiment, the third communication device 410 is an RSU.

In one embodiment, the third communication device 410 is a UE.

In one embodiment, at least one of the antenna 420, the transmitter 418, the multi-antenna transmitting processor 471, the transmitting processor 416 or the controller/processor 475 is used for transmitting a third radio signal in the present disclosure.

In one embodiment, at least one of the antenna 452, the receiver 454, the multi-antenna receiving processor 458, the receiving processor 456 or the controller/processor 459 is used for receiving a third radio signal in the present disclosure.

In one embodiment, at least one of the antenna 452, the receiver 454, the multi-antenna receiving processor 458, the receiving processor 456 or the controller/processor 459 is used for receiving a first radio signal set in the present disclosure.

In one embodiment, at least one of the antenna 420, the transmitter 418, the multi-antenna transmitting processor 471, the transmitting processor 416 or the controller/processor 475 is used for transmitting a twelfth radio signal in the present disclosure.

In one embodiment, at least one of the antenna 452, the transmitter 454, the multi-antenna transmitting processor 457, the transmitting processor 468 or the controller/processor 459 is used for transmitting a fifth radio signal in the present disclosure.

In one embodiment, at least one of the antenna 420, the receiver 418, the multi-antenna receiving processor 472, the receiving processor 470 or the controller/processor 475 is used for receiving a fifth radio signal in the present disclosure.

In one embodiment, at least one of the antenna 452, the transmitter 454, the multi-antenna transmitting processor 457, the transmitting processor 468 or the controller/processor 459 is used for transmitting third information in the present disclosure.

In one embodiment, at least one of the antenna 420, the receiver 418, the multi-antenna receiving processor 472, the receiving processor 470 or the controller/processor 475 is used for receiving third information in the present disclosure.

In one embodiment, at least one of the antenna 452, the receiver 454, the multi-antenna receiving processor 458, the receiving processor 456 or the controller/processor 459 is used for receiving a fourth information set in the present disclosure.

In one embodiment, at least one of the antenna 420, the transmitter 418, the multi-antenna transmitting processor 471, the transmitting processor 416 or the controller/processor 475 is used for transmitting seventh information in the present disclosure.

In one embodiment, at least one of the antenna 452, the transmitter 454, the multi-antenna transmitting processor 457, the transmitting processor 468 or the controller/processor 459 is used for transmitting a seventh radio signal in the present disclosure.

In one embodiment, at least one of the antenna 420, the receiver 418, the multi-antenna receiving processor 472, the receiving processor 470 or the controller/processor 475 is used for receiving a seventh radio signal in the present disclosure.

In one embodiment, at least one of the antenna 452, the transmitter 454, the multi-antenna transmitting processor 457, the transmitting processor 468 or the controller/processor 459 is used for transmitting a ninth radio signal in the present disclosure.

In one embodiment, at least one of the antenna 420, receiver 418, the multi-antenna receiving processor 472, the receiving processor 470 or the controller/processor 475 is used for receiving a ninth radio signal in the present disclosure.

Embodiment 5

Figure 5:
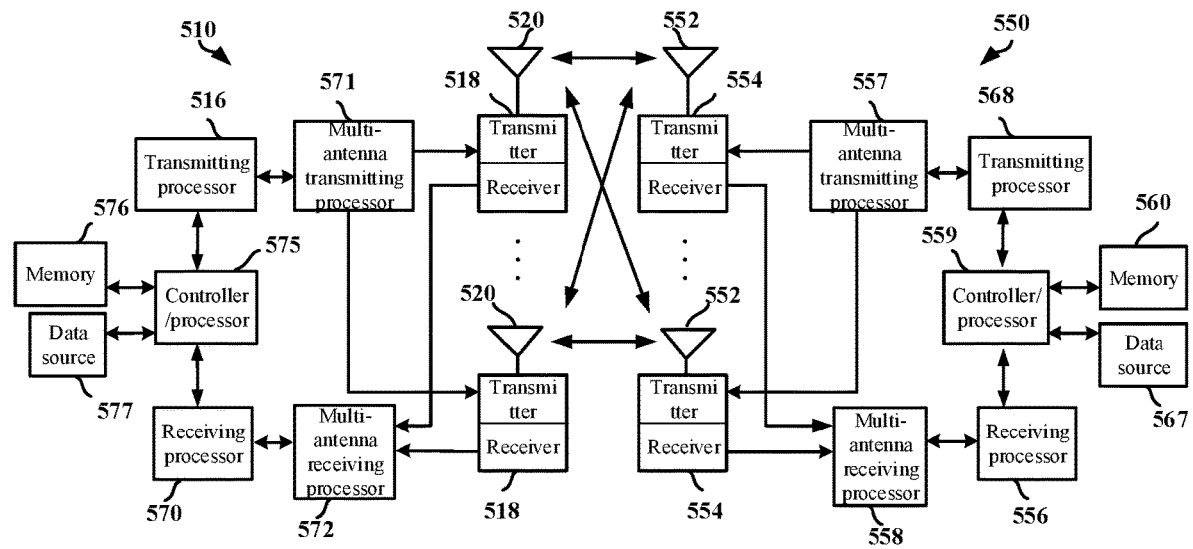
FIG. 5 illustrates another schematic diagram of hardcore modules in a communication device according to one embodiment of the present disclosure.

Embodiment 5 illustrates another schematic diagram of hardcore modules in a communication device according to one embodiment of the present disclosure, as shown in FIG. 5. FIG. 5 is a block diagram of a second communication device 550 and a third communication device 510 in communication with each other in an access network.

The second communication device 550 comprises a controller/processor 559, a memory 560, a data source 567, a transmitting processor 568, a receiving processor 556, a multi-antenna transmitting processor 557, a multi-antenna receiving processor 558, a transmitter/receiver 554 and an antenna 552.

The third communication device 510 comprises a controller/processor 575, a memory 576, a data source 577, a receiving processor 570, a transmitting processor 516, a multi-antenna receiving processor 572, a multi-antenna transmitting processor 571, a transmitter/receiver 518 and an antenna 520.

In a transmission from the third communication device 510 to the second communication device 550, at the third communication device 510, a higher layer packet from a core network or a data source 577 is provided to the controller/processor 575. The core network and the data source 577 represent all protocol layers above the L2. The controller/processor 575 implements the functionality of the L2 layer. In the transmission from the third communication device 510 to the second communication device 550, the controller/processor 575 provides header compression, encryption, packet segmentation and reordering, multiplexing between a logical channel and a transport channel and radio resource allocation of the second communication device 550 based on various priorities. The controller/processor 575 is also in charge of a retransmission of a lost packet and a signaling to the second communication device 550. The transmitting processor 516 and the multi-antenna transmitting processor 571 perform various signal processing functions used for the L1 layer (i.e., PHY). The transmitting processor 516 performs coding and interleaving so as to ensure a Forward Error Correction (FEC) at the third communication device 510 side and the mapping of signal clusters corresponding to each modulation scheme (i.e., BPSK, QPSK, M-PSK, and M-QAM, etc.). The multi-antenna transmitting processor 571 performs digital spatial precoding, including codebook-based precoding and non-codebook-based precoding, and beamforming processing on encoded and modulated symbols to generate one or more spatial streams. The transmitting processor 516 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 571 performs transmission analog precoding/beamforming on the time-domain multicarrier symbol streams. Each transmitter 518 converts a baseband multicarrier symbol stream provided by the multi-antenna transmitting processor 571 into a radio frequency (RF) stream, which is later provided to antennas 520.

In a transmission from the third communication device 510 to the second communication device 550, at the second communication device 550, each receiver 554 receives a signal via a corresponding antenna 552. Each receiver 554 recovers information modulated onto the RF carrier, and converts the radio frequency stream into a baseband multicarrier symbol stream to be provided to the receiving processor 556. The receiving processor 556 and the multi-antenna receiving processor 558 perform signal processing functions of the L1 layer. The multi-antenna receiving processor 558 performs reception analog precoding/beamforming on a baseband multicarrier symbol stream provided by the receiver 554. The receiving processor 556 converts the processed baseband multicarrier symbol stream from time domain into frequency domain using FFT. In frequency domain, a physical layer data signal and a reference signal are de-multiplexed by the receiving processor 556, wherein the reference signal is used for channel estimation, while the data signal is subjected to multi-antenna detection in the multi-antenna receiving processor 558 to recover any second communication device 550-targeted spatial stream. Symbols on each spatial stream are demodulated and recovered in the receiving processor 556 to generate a soft decision. Then the receiving processor 556 decodes and de-interleaves the soft decision to recover the higher-layer data and control signal transmitted by the third communication device 510. Next, the higher-layer data and control signal are provided to the controller/processor 559. The controller/processor 559 performs functions of the L2 layer. The controller/processor 559 can be associated with a memory 560 that stores program code and data. The memory 560 can be called a computer readable medium. In the transmission from the third communication device 510 to the second communication device 550, the controller/processor 559 provides demultiplexing between a transport channel and a logical channel, packet reassembling, decrypting, header decompression and control signal processing so as to recover a higher-layer packet from the third communication device 510. The higher-layer packet is later provided to all protocol layers above the L2 layer, or various control signals can be provided to the L3 layer for processing.

In a transmission from the second communication device 550 to the third communication device 510, at the second communication device 550, the data source 567 is configured to provide a higher-layer packet to the controller/processor 559. The data source 567 represents all protocol layers above the L2 layer. Similar to a transmitting function of the third communication device 510 described in the transmission from the third communication device 510 to the second communication device 550, the controller/processor 559 performs header compression, encryption, packet segmentation and reordering, and multiplexing between a logical channel and a transport channel based on radio resource allocation so as to provide the L2 layer functions used for the user plane and the control plane. The controller/processor 559 is also responsible for a retransmission of a lost packet, and a signaling to the third communication device 510. The transmitting processor 568 performs modulation and mapping, as well as channel coding, and the multi-antenna transmitting processor 557 performs digital multi-antenna spatial precoding, including codebook-based precoding and non-codebook-based precoding, and beamforming. The transmitting processor 568 then modulates generated spatial streams into multicarrier/single-carrier symbol streams. The modulated symbol streams, after being subjected to analog precoding/beamforming in the multi-antenna transmitting processor 557, are provided from the transmitter 554 to each antenna 552. Each transmitter 554 first converts a baseband symbol stream provided by the multi-antenna transmitting processor 557 into a radio frequency symbol stream, and then provides the radio frequency symbol stream to the antenna 552.

In a transmission from the second communication device 550 to the third communication device 510, the function of the third communication device 510 is similar to the receiving function of the second communication device 550 described in the transmission from the third communication device 510 to the second communication device 550. Each receiver 518 receives a radio frequency signal via a corresponding antenna 520, converts the received radio frequency signal into a baseband signal, and provides the baseband signal to the multi-antenna receiving processor 572 and the receiving processor 570. The receiving processor 570 and the multi-antenna receiving processor 572 jointly provide functions of the L1 layer.

The controller/processor 575 provides functions of the L2 layer. The controller/processor 575 can be associated with the memory 576 that stores program code and data. The memory 576 can be called a computer readable medium. In the transmission from the second communication device 550 to the third communication device 510, the controller/processor 575 provides de-multiplexing between a transport channel and a logical channel, packet reassembling, decrypting, header decompression, control signal processing so as to recover a higher-layer packet from the second communication device 550. The higher-layer packet coming from the controller/processor 575 may be provided to the core network, or all protocol layers above the L2, or, various control signals can be provided to the core network or L3 for processing.

In one embodiment, the second communication device 550 comprises at least one processor and at least one memory. The at least one memory comprises computer program codes; the at least one memory and the computer program codes are configured to be used in collaboration with the at least one processor. The second communication device 550 at least transmits a fourth radio signal and a second radio signal set, the fourth radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC SDU set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q.

In one embodiment, the second communication device 550 comprises a memory that stores a computer readable instruction program. The computer readable instruction program generates actions when executed by at least one processor. The actions include: transmitting a fourth radio signal and a second radio signal set, the fourth radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC SDU set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q.

In one embodiment, the second communication device 550 corresponds to a second node in the present disclosure.

In one embodiment, the third communication device 510 corresponds to a third node in the present disclosure.

In one embodiment, the second communication device 550 is a UE.

In one embodiment, the second communication device 550 is a UE supporting V2X.

In one embodiment, the second communication device 550 is a UE supporting D2D.

In one embodiment, the second communication device 550 is vehicle-mounted equipment.

In one embodiment, the second communication device 550 is an RSU.

In one embodiment, at least one of the antenna 552, the transmitter 554, the multi-antenna transmitting processor 557, the transmitting processor 568 or the controller/processor 559 is used for transmitting a fourth radio signal in the present disclosure.

In one embodiment, at least one of the antenna 520, the receiver 518, the multi-antenna receiving processor 572, the receiving processor 570 or the controller/processor 575 is used for receiving a fourth radio signal in the present disclosure.

In one embodiment, at least one of the antenna 552, the transmitter 554, the multi-antenna transmitting processor 557, the transmitting processor 568 or the controller/processor 559 is used for transmitting a second radio signal set in the present disclosure.

In one embodiment, at least one of the antenna 520, the receiver 518, the multi-antenna receiving processor 572, the receiving processor 570 or the controller/processor 575 is used for receiving an eleventh radio signal set in the present disclosure.

In one embodiment, at least one of the antenna 520, the transmitter 518, the multi-antenna transmitting processor 571, the transmitting processor 516 or the controller/processor 575 is used for transmitting a sixth radio signal in the present disclosure.

In one embodiment, at least one of the antenna 552, the receiver 554, the multi-antenna receiving processor 558, the receiving processor 556 or the controller/processor 559 is used for receiving a sixth radio signal in the present disclosure.

In one embodiment, at least one of the antenna 520, the transmitter 518, the multi-antenna transmitting processor 571, the transmitting processor 516 or the controller/processor 575 is used for transmitting an eighth radio signal in the present disclosure.

In one embodiment, at least one of the antenna 552, the receiver 554, the multi-antenna receiving processor 558, the receiving processor 556 or the controller/processor 559 is used for receiving an eighth radio signal in the present disclosure.

In one embodiment, at least one of the antenna 520, the transmitter 518, the multi-antenna transmitting processor 571, the transmitting processor 516 or the controller/processor 575 is used for transmitting a tenth radio signal in the present disclosure.

In one embodiment, at least one of the antenna 552, the receiver 554, the multi-antenna receiving processor 558, the receiving processor 556 or the controller/processor 559 is used for receiving a tenth radio signal in the present disclosure.

In one embodiment, at least one of the antenna 552, the transmitter 554, the multi-antenna transmitting processor 557, the transmitting processor 568 or the controller/processor 559 is used for transmitting an eighth information set in the present disclosure.

In one embodiment, at least one of the antenna 520, the receiver 518, the multi-antenna receiving processor 572, the receiving processor 570 or the controller/processor 575 is used for receiving ninth information in the present disclosure.

Embodiment 6

Figure 6:
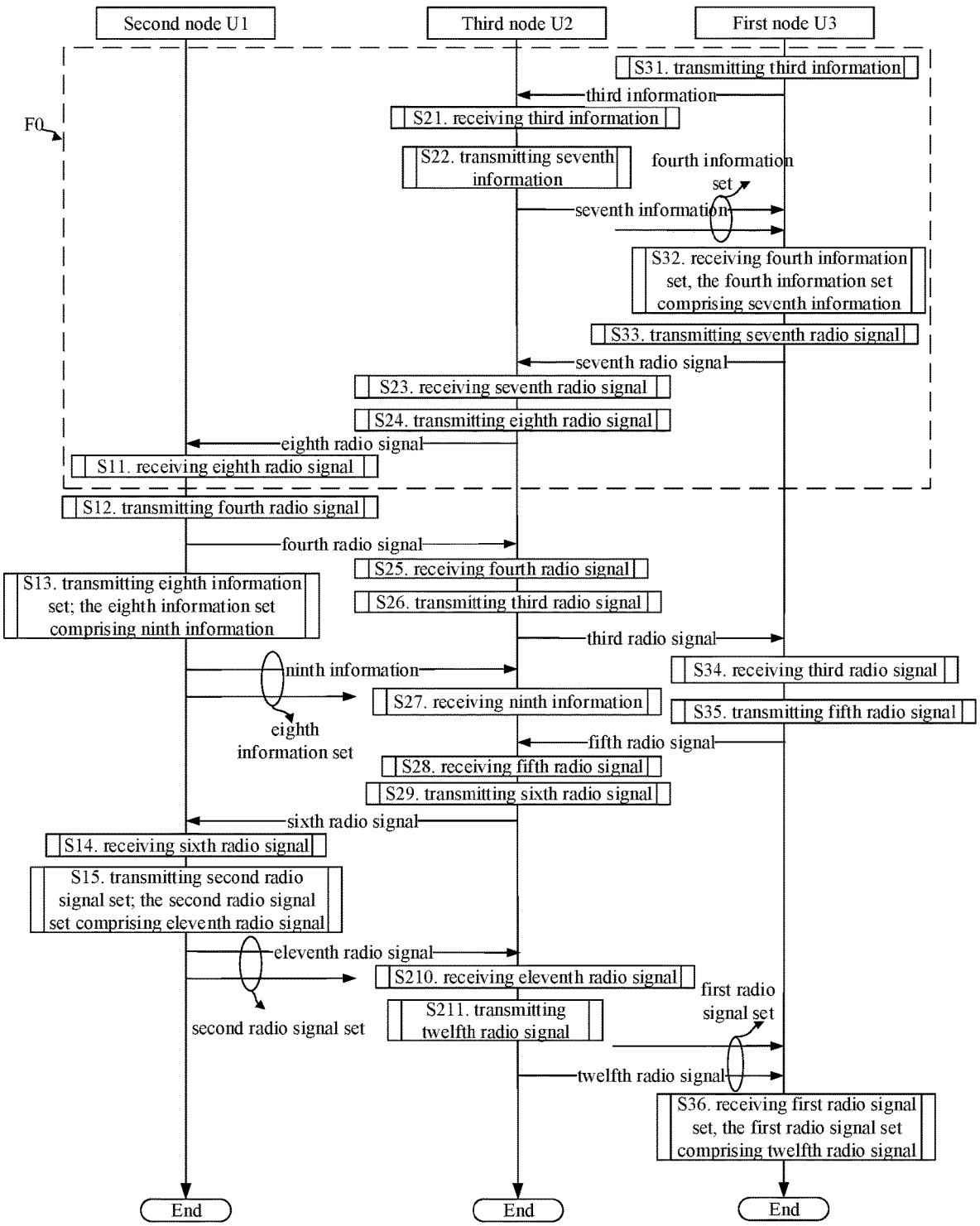
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second node U1 and a third node U2 are in communication via a sidelink interface, while the third node U2 and a first node U3 are in communication through the sidelink. It should be particularly noted that the sequence illustrated herein does not set a limit on the orders of signal transmissions and implementations in the present disclosure. As shown in FIG. 6, steps marked by the dotted-line box F0 are optional.

The first node U3 transmits third information in step S31; and receives a fourth information set in step S32, the fourth information set comprising seventh information; transmits a seventh radio signal in step S33; receives a third radio signal in step S34; and transmits a fifth radio signal in step S35; receives a first radio signal set in step S36, the first radio signal set comprising a twelfth radio signal.

The second node U1 receives an eighth radio signal in step S11; transmits a fourth radio signal in step S12; and transmits an eighth information set in step S13, the eighth information set comprising ninth information; receives a sixth radio signal in step S14; and transmits a second radio signal set in step S15, the second radio signal set comprising an eleventh radio signal. It should be noted that the step S12 can be implemented before the step S13, or can be implemented after the step S13 and before the step S14.

The third node U2 receives third information in step S21; transmits seventh information in step S22; and receives a seventh radio signal in step S23; transmits an eighth radio signal in step S24; receives a fourth radio signal in step S25; and transmits a third radio signal in step S26; receives ninth information in step S27; receives a fifth radio signal in step S28; and transmits a sixth radio signal in step S29; receives an eleventh radio signal in step S210; and transmits a twelfth radio signal in step S211. It should be noted that the step S27 can be implemented before the step S25, or can be implemented after the step S25 and before the step S210.

In one embodiment, the third information is transmitted via a PC5 interface.

In one embodiment, the third information is transmitted by broadcast.

In one embodiment, the third information is transmitted through SL.

In one embodiment, the third information is transmitted in a Physical Sidelink Discovery Channel (PSDCH).

In one embodiment, the third information is transmitted in a PSSCH.

In one embodiment, the third information is transmitted through a SL-SRB.

In one embodiment, the third information is transmitted through a SL-SRB0.

In one embodiment, the third information comprises PC5-Signaling (PC5-S) information.

In one embodiment, the third information comprises a discovery message, the discovery message being used to discover a candidate relay node.

In one embodiment, the discovery message comprises a first PC5 DISCOVERY message, and a type of the first PC5 DISCOVERY message is Discovery announcement.

In one embodiment, the first PC5 DISCOVERY message can adopt a PC5 DISCOVERY message structure defined in Chapter 11.2.5 of 3GPP TS24.334.

In one embodiment, the third information comprises a node ID of the second node.

In one embodiment, a MAC PDU transmitting the third information comprises part of bits in a node ID of the first node; scheduling information of the MAC PDU transmitting the third information comprises the rest of the bits in the node ID of the first node.

In one embodiment, a node ID of the second node is a link layer ID.

In one embodiment, a node ID of the second node is a L2 ID.

In one embodiment, a node ID of the second node is a source layer 2 ID.

In one embodiment, the fourth information set comprises at least one piece of information.

In one embodiment, the fourth information set is transmitted via a PC5 interface.

In one embodiment, any piece of information in the fourth information set is transmitted by broadcast.

In one embodiment, the fourth information set is transmitted through SL.

In one embodiment, any piece of information in the fourth information set is transmitted in a PSDCH.

In one embodiment, any piece of information in the fourth information set is transmitted in a PSSCH.

In one embodiment, the fourth information set is transmitted through a SL-SRB.

In one embodiment, the fourth information set is transmitted through a SL-SRB0.

In one embodiment, the fourth information set comprises PC5-Signaling (PC5-S) information.

In one embodiment, any piece of information in the fourth information set comprises second PC5_DISCOVERY message, and a type of the second PC5_DISCOVERY message is Discovery response.

In one embodiment, the second PC5 DISCOVERY message can adopt a PC5_DISCOVERY message structure defined in Chapter 11.2.5 of 3GPP TS24.334.

In one embodiment, any piece of information in the fourth information set comprises the node ID of the second node.

In one embodiment, any piece of information in the fourth information set carries a node ID of a source transmitter that transmits the information.

In one embodiment, a MAC PDU transmitting any piece of information in the fourth information set comprises part of bits in a node ID of a transmitter of the MAC PDU; scheduling information of the MAC PDU transmitting the any piece of information in the fourth information set comprises the rest of the bits in the node ID of the transmitter of the MAC PDU.

In one embodiment, any piece of information in the fourth information set comprises a response to the third information.

In one embodiment, the fourth information set comprises at least two pieces of information; among source transmitters that transmit the fourth information set, any two source transmitters are not co-located.

In one embodiment, source transmitters that transmit the fourth information set are candidate relay nodes.

In one embodiment, the fourth information set at least comprises P pieces of information.

In one embodiment, the source transmitters that transmit the fourth information set at least comprise P relay nodes.

In one embodiment, the first node determining P candidate node IDs according to the fourth information set received comprises: selecting P candidate nodes from the group of source transmitters that transmit the fourth information set in a descending order, according to a Reference Signal Received Power (RSRP) of a received radio signal set carrying the fourth information set, and then generating a first sequence; the P candidate nodes are respectively identified by the P candidate node IDs; the first sequence comprises the P candidate node IDs; a firstly selected candidate node is arranged in the first place among the first sequence; and a secondly selected candidate node is arranged in the second place among the first sequence, and so on, till a P-th candidate node is selected and arranged in a P-th place among the first sequence.

In one embodiment, the P candidate node IDs are determined according to part of bits in a node ID of a transmitter of a MAC PDU comprised by the MAC PDU carrying a piece of information in the fourth information set and the remaining bits in the node ID of the transmitter of the MAC PDU comprised by scheduling information of the MAC PDU carrying the piece of information in the fourth information set having been received.

In one embodiment, the P candidate node IDs respectively indicate P candidate relay nodes.

In one embodiment, the P candidate node IDs comprise the Q node IDs; P being a positive integer no less than Q.

In one embodiment, a source transmitter of the fifth information is the first node; the third node receives the seventh radio signal, recovers the fifth information and forwards the fifth information via the eighth radio signal; a target receiver of the fifth information is the second node.

In one embodiment, a transmitter of the seventh radio signal and a target receiver of the eighth radio signal are not co-located.

In one embodiment, the seventh radio signal and the eighth radio signal are respectively transmitted via radio interfaces.

In one embodiment, the seventh radio signal and the eighth radio signal are respectively transmitted via PC5 interfaces.

In one embodiment, the seventh radio signal and the eighth radio signal are respectively transmitted through SL.

In one embodiment, the seventh radio signal and the eighth radio signal are respectively transmitted through Physical Sidelink Shared Channels (PSSCHs).

In one embodiment, the seventh radio signal and the eighth radio signal are respectively transmitted through SRBs.

In one embodiment, the seventh radio signal and the eighth radio signal are respectively transmitted by unicast.

In one embodiment, time-frequency resources occupied by the seventh radio signal and time-frequency resources occupied by the eighth radio signal respectively belong to a V2X resource pool.

In one embodiment, time-frequency resources occupied by the seventh radio signal and time-frequency resources occupied by the eighth radio signal are respectively reserved for sidelink transmissions.

In one embodiment, the seventh radio signal and the eighth radio signal respectively comprise the fifth information.

In one embodiment, the fifth information comprises RRC information.

In one embodiment, the fifth information comprises PC5-RRC information.

In one embodiment, the fifth information comprises all or part of Information Elements (IEs) in a piece of RRC information.

In one embodiment, the fifth information comprises a CandidateRelayList IE in a piece of RRC information.

In one embodiment, the fifth information comprises all or part of fields of an IE in a piece of RRC information.

In one embodiment, the fifth information comprises RRCReconfigurationRequestSidelink.

In one embodiment, the fifth information comprises PC5-Signaling (PC5-S) information.

In one embodiment, the fifth information comprises the P candidate node IDs.

In one embodiment, the fifth information comprises the first sequence.

In one embodiment, the second node receives the eighth radio signal, recovers the fifth information from the eighth radio signal, and selects the Q node IDs out of the P candidate node IDs comprised by the fifth information.

In one embodiment, a source transmitter of the first information is the second node; the third node receives the fourth radio signal, recovers the first information and forwards the first information via the third radio signal; a target receiver of the first information is the first node.

In one embodiment, a transmitter of the fourth radio signal is the second node in the present disclosure.

In one embodiment, the fourth radio signal is transmitted via a radio interface.

In one embodiment, the fourth radio signal is transmitted via a PC5 interface.

In one embodiment, the fourth radio signal is transmitted through SL.

In one embodiment, the fourth radio signal is a PSSCH.

In one embodiment, the fourth radio signal is transmitted through a SL-SRB.

In one embodiment, the fourth radio signal is transmitted through a SL-SRB3.

In one embodiment, time-frequency resources occupied by the fourth radio signal belong to a V2X resource pool.

In one embodiment, time-frequency resources occupied by the fourth radio signal are reserved for sidelink transmission.

In one embodiment, the fourth radio signal comprises the first information.

In one embodiment, the second node randomly selects Q node IDs from the first sequence to generate the node ID group.

In one embodiment, the second node selects the first Q node IDs from the first sequence to generate the node ID group.

In one embodiment, a transmitter of the fourth radio signal and a target receiver of the third radio signal are not co-located.

In one embodiment, a source transmitter of the second information is the first node; the third node receives the fifth radio signal, recovers the second information, and forwards the second information through the sixth radio signal; a target receiver of the second information is the second node.

In one embodiment, a transmitter of the fifth radio signal and a target receiver of the sixth radio signal are not co-located.

In one embodiment, the fifth radio signal and the sixth radio signal are respectively transmitted via radio interfaces.

In one embodiment, the fifth radio signal and the sixth radio signal are respectively transmitted via PC5 interfaces.

In one embodiment, the fifth radio signal and the sixth radio signal are respectively transmitted through SL.

In one embodiment, the fifth radio signal and the sixth radio signal are respectively transmitted through PSSCHs.

In one embodiment, the fifth radio signal and the sixth radio signal are respectively transmitted through SL-SRBs.

In one embodiment, the fifth radio signal and the sixth radio signal are respectively transmitted through SL-SRB3 s.

In one embodiment, time-frequency resources occupied by the fifth radio signal and time-frequency resources occupied by the sixth radio signal respectively belong to a V2X resource pool.

In one embodiment, time-frequency resources occupied by the fifth radio signal and time-frequency resources occupied by the sixth radio signal are respectively reserved for sidelink transmissions.

In one embodiment, the fifth radio signal and the sixth radio signal respectively comprise the second information.

In one embodiment, the second information comprises RRC information.

In one embodiment, the second information comprises PC5-RRC information.

In one embodiment, the second information comprises all or part of IEs in a piece of RRC information.

In one embodiment, the second information comprises all or part of fields of an IE in a piece of RRC information.

In one embodiment, the second information comprises RRCReconfigurationcompleteSidelink.

In one embodiment, the second information comprises a response to the first information.

In one embodiment, a target receiver of the fifth radio signal is the transmitter of the third radio signal.

In one embodiment, the second information comprises RRCReconfigurationcompleteSidelin; a MAC PDU comprising the RRCReconfigurationcompleteSidelink comprises a UE ID in a MAC PDU carried by the third radio signal; SCI for scheduling the RRCReconfigurationcompleteSidelink comprises a UE ID in SCI scheduling the third radio signal.

In one embodiment, the second node transmits the eighth information set; target receivers that receive the eighth information set are Q nodes identified by the Q node IDs.

In one embodiment, the eighth information set comprises the ninth information, and a receiver of the ninth information is the third node in the present disclosure.

In one embodiment, the fourth radio signal comprises the ninth information, the ninth information being received by a higher layer of the third node.

In one embodiment, each piece of information in the eighth information set is transmitted by unicast.

In one embodiment, each piece of information in the eighth information set comprises RRC information.

In one embodiment, each piece of information in the eighth information set comprises PC5-RRC information.

In one embodiment, each piece of information in the eighth information set comprises all or part of IEs in a piece of RRC information.

In one embodiment, each piece of information in the eighth information set comprises all or part of fields of an IE in a piece of RRC information.

In one embodiment, each piece of information in the eighth information set comprises RRCReconfigurationSidelink.

In one embodiment, any piece of information in the eighth information set comprises the second configuration.

In one embodiment, the second configuration is a field of any piece of information in the eighth information set.

In one embodiment, the second configuration is a SLRB-Config field of any piece of information in the eighth information set.

In one embodiment, the second configuration is a slrb-ConfigToAddModList field of any piece of information in the eighth information set.

In one embodiment, the second parameter set comprises at least a former of a MAC sublayer configuration parameter and an RLC sublayer configuration parameter.

In one embodiment, the second parameter set comprises the first radio bearer ID.

In one embodiment, the second parameter set is used for configuring RLC Bearers for the third node.

In one embodiment, the RLC Bearers for the third node comprises a RLC bearer for the third node corresponding to transmission of the second node and a RLC bearer for the third node corresponding to transmission of the first node.

In one embodiment, the RLC Bearers for the third node constitutes a peer-to-peer radio bearer indicated by the first radio bearer ID.

In one embodiment, the second parameter set is used for configuring RLC bearers for Q nodes identified by the Q node IDs.

In one embodiment, the second parameter set is used for configuring a higher-layer entity corresponding to the RLC bearers for the Q nodes identified by the Q node IDs.

In one embodiment, the higher-layer entity corresponding to the RLC bearers for the Q nodes includes at least a former of a MAC entity and an RLC entity.

In one embodiment, the second parameter set comprises a LCID corresponding to the RLC bearers for the Q nodes.

In one embodiment, the LCID comprised by the second parameter set is the same as the LCID comprised by the first parameter set.

In one embodiment, any one of the RLC bearers for the Q nodes can be used for transmitting traffics to which the first MAC SDU set belongs.

In one embodiment, any one of the RLC bearers for the Q nodes can be used for transmitting PC5 QoS streams to which the first MAC SDU set belongs.

In one embodiment, after transmitting the eighth information set the second node receives a tenth information set; the tenth information set is a response to the eighth information set; source transmitters of the tenth information set are Q nodes identified by the Q node IDs.

In one embodiment, each piece of information in the tenth information set is transmitted by unicast.

In one embodiment, each piece of information in the tenth information set comprises PC5-RRC information.

In one embodiment, each piece of information in the tenth information set comprises RRCReconfigurationcompleteSidelink.

In one embodiment, the second node transmits the second radio signal set.

In one embodiment, the second radio signal set comprises at least one radio signal.

In one embodiment, the second radio signal set comprises the eleventh radio signal.

In one embodiment, the second radio signal set is transmitted via a radio interface.

In one embodiment, the second radio signal set is transmitted via a PC5 interface.

In one embodiment, the second radio signal set is transmitted through SL.

In one embodiment, any radio signal in the second radio signal set occupies a PSSCH.

In one embodiment, any radio signal in the second radio signal set occupies a physical channel.

In one embodiment, any radio signal in the second radio signal set is transmitted through a DRB.

In one embodiment, the second radio signal set comprises at least two radio signals; any two radio signals in the second radio signal set are transmitted in different sidelink slots.

In one embodiment, the second radio signal set comprises at least two radio signals;

any two radio signals in the second radio signal set carry different information bits.

In one embodiment, the second radio signal set comprises at least two radio signals;

any two radio signals in the second radio signal set carry different TBs.

In one embodiment, the second radio signal set comprises at least two radio signals;

any two radio signals in the second radio signal set are received by a same target receiver.

In one embodiment, the second radio signal set comprises at least two radio signals; at least two radio signals in the second radio signal set are received by different target receivers.

In one embodiment, time-frequency resources occupied by the second radio signal set belong to a V2X resource pool.

In one embodiment, time-frequency resources occupied by the second radio signal set are reserved for sidelink transmission.

In one embodiment, the fourth radio signal and any radio signal in the second radio signal set are transmitted in different sidelink slots.

In one embodiment, the fourth radio signal is transmitted earlier than the second radio signal set.

In one embodiment, a target receiver of the second radio signal set comprises a node identified by any node ID of the Q node IDs.

In one embodiment, a number of radio signals comprised by the second radio signal set is no smaller than a number of radio signals comprised by the first radio signal set.

In one embodiment, a target signaling comprises physical layer signalings respectively corresponding to each of the Q node IDs; the first receiver monitors the target signaling in a first time-frequency resource pool.

In one embodiment, the target signaling is used for indicating time-frequency resources occupied by a target radio signal and a Modulation and Coding Scheme (MCS) employed by the target radio signal.

In one embodiment, the target signaling is monitored in each slot in the first time-frequency resource pool.

In one embodiment, the target signaling is monitored in some slots in the first time-frequency resource pool.

In one embodiment, the target signaling is monitored in each slot on which wireless transmission is not performed in the first time-frequency resource pool.

In one embodiment, the target signaling is monitored in each slot on which sidelink wireless transmission is not performed in the first time-frequency resource pool.

In one embodiment, the target signaling is monitored in each slot on which wireless reception is performed in the first time-frequency resource pool.

In one embodiment, the target signaling is monitored in each slot on which sidelink wireless reception is performed in the first time-frequency resource pool.

In one embodiment, the phrase of monitoring a target signaling in the first time-frequency resource pool comprises performing energy detection for the target signaling in the first time-frequency resource pool.

In one embodiment, the phrase of monitoring a target signaling in the first time-frequency resource pool comprises performing blind decoding for the target signaling in the first time-frequency resource pool.

In one embodiment, the phrase of monitoring a target signaling in the first time-frequency resource pool comprises performing blind decoding for the target signaling and energy detection on the target radio signal in the first time-frequency resource pool.

In one embodiment, the phrase of monitoring a target signaling in the first time-frequency resource pool comprises performing blind decoding for the target signaling and energy detection on a reference signal of the target radio signal in the first time-frequency resource pool.

In one embodiment, the phrase of monitoring a target signaling in the first time-frequency resource pool comprises performing blind decoding for the target signaling, performing energy detection on a reference signal of the target radio signal and performing decoding on the target radio signal in the first time-frequency resource pool.

In one embodiment, the phrase of monitoring a target signaling in the first time-frequency resource pool comprises performing Cyclic Redundancy Check (CRC) for the target signaling in the first time-frequency resource pool.

In one embodiment, the first time-frequency resource pool is reserved for sidelink transmission.

In one embodiment, the first time-frequency resource pool belongs to a V2X resource pool.

In one embodiment, when the physical layer signaling corresponding to any of the Q node IDs is successfully decoded, the physical layer signaling is detected.

In one embodiment, when the physical layer signaling corresponding to any of the Q node IDs passes CRC, the physical layer signaling is detected.

In one embodiment, with Q2 being greater than 1, any two physical layer signalings of the Q2 physical layer signalings are detected in different sidelink slots.

In one embodiment, with Q2 being greater than 1, at least two physical layer signalings of the Q2 physical layer signalings are detected in a same sidelink slot.

In one embodiment, any of the Q2 physical layer signalings comprises part of bits in a node ID of the Q node IDs.

In one embodiment, transmitters that transmit the Q2 physical layer signalings are identified by a node ID of the Q node IDs.

In one embodiment, with Q2 being greater than 1, transmitters that transmit at least two physical layer signalings of the Q2 physical layer signalings are identified by two different node IDs of the Q node IDs.

In one embodiment, the Q2 physical layer signalings respectively comprise Q2 pieces of SCI.

In one embodiment, the first radio signal set comprises Q2 radio signals, and the Q2 physical layer signalings respectively comprise scheduling information of the Q2 radio signals.

In one embodiment, a source transmitter of the first MAC SDU set is the second node.

In one embodiment, a target receiver of the first MAC SDU set is the first node.

In one embodiment, a MAC subheader corresponding to any MAC SDU in the first MAC SDU set comprises an LCID; the LCID is used for indicating a higher layer entity that processes any MAC SDU in the first MAC SDU set.

In one embodiment, any MAC SDU is distributed to a target RLC entity of the first node according to an LCID of any MAC SDU in the first MAC SDU set.

In one embodiment, the first MAC SDU set comprises at least two MAC SDUs; any two MAC SDUs in the first MAC SDU set share a same LCID.

In one embodiment, the phrase that the target RLC entity of the first node is unrelated to a node ID of a transmitter of the MAC SDU comprises: any MAC SDU in the first MAC SDU set is distributed to the target RLC entity of the first node.

In one embodiment, the phrase that the target RLC entity of the first node is unrelated to a node ID of a transmitter of the MAC SDU comprises: the first MAC SDU set comprises at least two MAC SDUs, and transmitters that transmit the at least two MAC SDUs in the first MAC SDU set are identified by at least two node IDs of the Q node IDs.

In one embodiment, the phrase that the target RLC entity of the first node is unrelated to a node ID of a transmitter of the MAC SDU comprises: each MAC SDU in the first MAC SDU set correspond to the same LCID; the LCID is associated with the target RLC entity of the first node.

Embodiment 7

Figure 7:
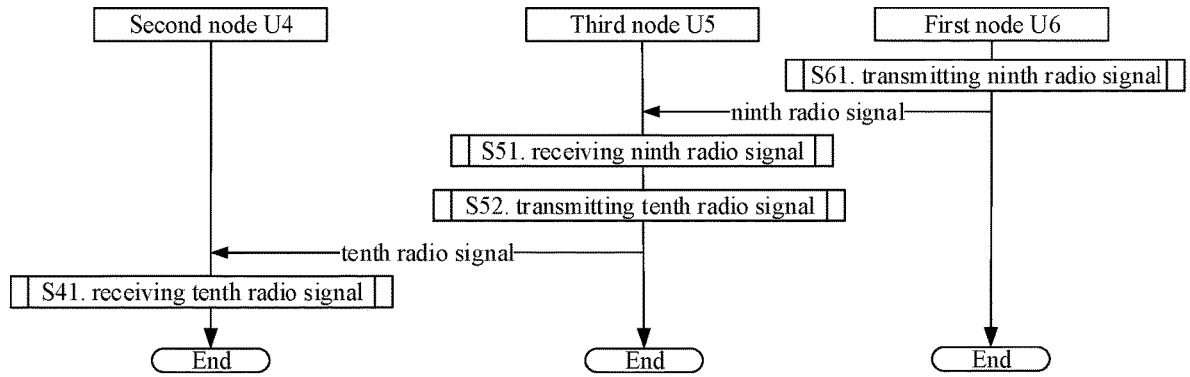
FIG. 7 illustrates another flowchart of radio signal procedure according to one embodiment of the present disclosure.

Embodiment 7 illustrates another flowchart of radio signal procedure according to one embodiment of the present disclosure, as shown in FIG. 7. A second node U4 and a third node U5 are in communication via a sidelink interface, and the third node U5 and a first node U6 are in communication through the sidelink. It should be particularly noted that the sequence illustrated herein does not set a limit on the orders of signal transmissions and implementations in the present disclosure.

The first node U6 transmits a ninth radio signal in step S61.

The second node U4 receives a tenth radio signal in step S41.

The third node U5 receives a ninth radio signal in step S51; and transmits a tenth radio signal in step S52.

In one embodiment, the first transmitter determines a first radio link failure; and, as a response to the first radio link failure, transmits a ninth radio signal.

In one embodiment, the first radio link comprises a node identified by the first node ID, the first node ID belonging to the Q node IDs.

In one embodiment, the first radio link comprises at least one of the RLC bearer for the third node corresponding to transmission of the second node or the RLC bearer for the third node corresponding to transmission of the first node.

In one embodiment, the phrase that the target RLC entity of the first node is unrelated to a node ID of a transmitter of the MAC SDU comprises: the first radio link comprises a node identified by the first node ID, the first node ID belonging to the Q node IDs; the first radio link failure does not trigger the release of the target RLC entity.

In one embodiment, the first node ID identifies a relay node.

In one embodiment, a node identified by the first node ID and the third node in the present disclosure are not co-located.

In one embodiment, when the target RLC entity of the first node indicates that a number of RLC retransmissions for the first node ID has reached a maximum value, the first radio link failure is determined.

In one subembodiment, the maximum number of RLC retransmissions is pre-configured.

In one subembodiment, the maximum number of RLC retransmissions is configured by networks.

In one embodiment, when a timer T400 of the first node is expired, the first radio link failure is determined.

In one embodiment, when a timer T400 of the first node for the first node ID is expired, the first radio link failure is determined.

In one embodiment, when a MAC entity of the first node indicates that HARQ Discontinuous Transmissions (DTX) for the first node ID have reached a maximum value, the first radio link failure is determined.

In one subembodiment, the maximum value of HARQ DTX is pre-configured.

In one subembodiment, the maximum value of HARQ DTX is configured by networks.

In one embodiment, when a PDCP entity corresponding to the Radio Bearer for the first node indicates that Integrity check of a SL-SRB2 or a SL-SRB3 is failed, the first radio link failure is determined.

In one embodiment, a target receiver of the ninth radio signal is a node identified by any of the Q node IDs other than the first node ID.

In one embodiment, the target receiver of the ninth radio signal is a node identified by a node ID which ranks only second to the first node ID among the first sequence.

In one embodiment, a transmitter of the ninth radio signal and a target receiver of the tenth radio signal are not co-located.

In one embodiment, the ninth radio signal and the tenth radio signal are respectively transmitted via air interfaces.

In one embodiment, the ninth radio signal and the tenth radio signal are respectively transmitted via radio interfaces.

In one embodiment, the ninth radio signal and the tenth radio signal are respectively transmitted via PC5 interfaces.

In one embodiment, the ninth radio signal and the tenth radio signal are respectively transmitted through SL.

In one embodiment, the ninth radio signal and the tenth radio signal are respectively PSSCHs.

In one embodiment, the ninth radio signal and the tenth radio signal are respectively transmitted through SL-SRBs.

In one embodiment, the ninth radio signal and the tenth radio signal are respectively transmitted through SL-SRB3 s.

In one embodiment, time-frequency resources occupied by the ninth radio signal and time-frequency resources occupied by the tenth radio signal respectively belong to a V2X resource pool.

In one embodiment, time-frequency resources occupied by the ninth radio signal and time-frequency resources occupied by the tenth radio signal are respectively reserved for sidelink transmissions.

In one embodiment, the ninth radio signal and the tenth radio signal respectively comprise sixth information.

In one embodiment, the third node in the present disclosure receives the ninth radio signal, recovers the sixth information and forwards the sixth information through the tenth radio signal.

In one embodiment, a source transmitter of the sixth information is the first node.

In one embodiment, a target receiver of the sixth information is the second node.

In one embodiment, the second node receives the sixth information, the sixth information indicating the first radio link failure.

In one embodiment, the sixth information comprises the first node ID.

In one embodiment, the sixth information comprises an updated candidate node ID, the updated candidate node ID not comprising the first node ID.

In one embodiment, the sixth information comprises PC5-RRC information.

In one embodiment, the sixth information comprises all or part of IEs in a piece of RRC information.

In one embodiment, the sixth information comprises all or part of fields of an IE in a piece of RRC information.

In one embodiment, the sixth information comprises RRCReconfigurationSidelink.

In one embodiment, the sixth information comprises a FailureRelayList IE in a piece of RRC information.

In one embodiment, the sixth information comprises a UpdateRelayList IE in a piece of RRC information.

In one embodiment, the second receiver receives the sixth information; as a response to receiving the sixth information, the second transmitter transmits eleventh information; the eleventh information is forwarded via the third node to the first node; a target receiver of the eleventh information is the first node.

In one embodiment, the eleventh information comprises RRC information.

In one embodiment, the eleventh information comprises PC5-RRC information.

In one embodiment, the eleventh information comprises all or part of IEs in a piece of RRC information.

In one embodiment, the eleventh information comprises all or part of fields of an IE in a piece of RRC information.

In one embodiment, the eleventh information comprises RRCReconfigurationcompleteSidelink.

In one embodiment, the eleventh information comprises RRCReconfigurationcompleteSidelink; a MAC PDU comprising the RRCReconfigurationcompleteSidelink comprises a UE ID in a MAC PDU carried by the tenth radio signal; SCI for scheduling the RRCReconfigurationcompleteSidelink comprises a UE ID in SCI scheduling the tenth radio signal.

In one embodiment, upon reception of the sixth information by the second node, a target receiver of the second radio signal set does not comprise a node identified by the first node ID.

In one embodiment, after receiving the sixth information, the second node transmits twelfth information, a target receiver of the twelfth information being a node identified by the first node ID; the twelfth information indicates the release of RLC bearers for the node identified by the first node ID.

In one embodiment, after transmitting the sixth information, the first node transmits thirteenth information, a target receiver of the thirteenth information being a node identified by the first node ID; the thirteenth information indicates the release of RLC bearers for the node identified by the first node ID.

Embodiment 8

Figure 8:
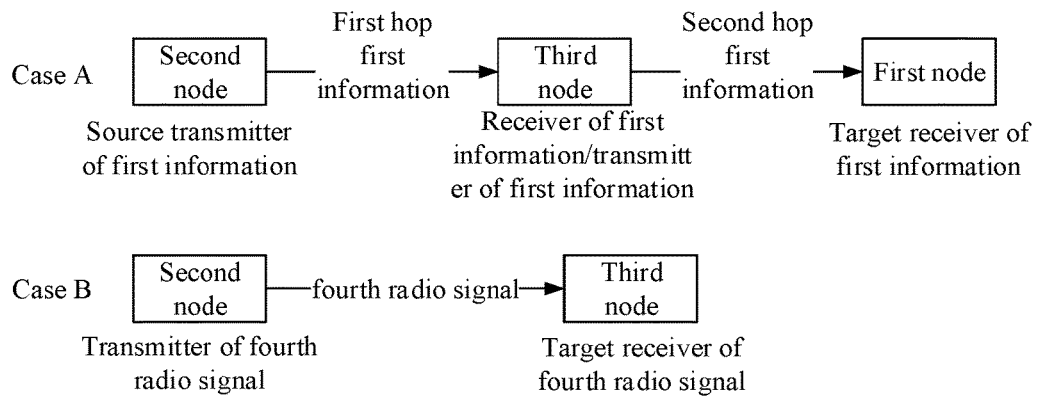
FIG. 8 illustrates a schematic diagram of a source transmitter, a transmitter, a receiver and a target receiver according to one embodiment of the present disclosure.

Embodiment 8 illustrates a schematic diagram of a source transmitter, a transmitter, a receiver and a target receiver according to one embodiment of the present disclosure, as shown in FIG. 8.

In one embodiment, a source transmitter that transmits the first MAC SDU set refers to:

generating the first MAC SDU set based on an RLC SDU set on an RLC sublayer to be transmitted on an air interface.

In one embodiment, a source transmitter that transmits the first MAC SDU set refers to: generating the first MAC SDU set based on a PDCP SDU set on a PDCP sublayer to be transmitted on an air interface.

In one embodiment, a target receiver that receives the first MAC SDU set refers to: receiving the first MAC SDU set through an air interface, and not forwarding the first MAC SDU set through an air interface.

In one embodiment, a target receiver that receives the first MAC SDU set refers to: receiving the first MAC SDU set through an air interface, and delivering data carried in the first MAC SDU set to an RLC sublayer.

In one embodiment, a target receiver that receives the first MAC SDU set refers to: receiving the first MAC SDU set through an air interface, and delivering data carried in the first MAC SDU set to a PDCP sublayer.

In one embodiment, a source transmitter of the first information refers to: generating the first information on an RRC layer to be transmitted by an air interface.

In one embodiment, a source transmitter of the first information refers to: generating first information on an RRC layer based on data received from NAS, which is to be transmitted by an air interface.

In one embodiment, a target receiver of the first information refers to: receiving the first information through an air interface, and not forwarding the first information through an air interface.

In one embodiment, a target receiver of the first information refers to: receiving the first information through an air interface, and delivering data carried in the first information to RRC.

In one embodiment, a target receiver of the first information refers to: receiving the first information through an air interface, and delivering data carried in the first information to NAS.

As illustrated in Case A in FIG. 8, the first information is generated by the second node, the second node being a source transmitter of the first information; the first information is cancelled by the first node, the first node being a target receiver of the first information; transmission of the first information from the second node to the first node is relayed by the third node as a relay node, respectively dividing into a first hop transmission and a second hop transmission; during the first hop transmission, the third node serves as a receiver of the first information; during the second hop transmission, the third node serves as a transmitter of the first information.

In one embodiment, take the first information as an example in Case A in FIG. 8, for transmissions of the second information, the fifth information, the sixth information and the eleventh information in the present disclosure, the descriptions about the source transmitter, transmitter, receiver and target receiver of information above are also applicable, hence no further details given here.

As illustrated in Case B in FIG. 8, the fourth radio signal is generated by the second node, the second node being a transmitter of the fourth radio signal; the fourth radio signal is cancelled by the third node, the third node being a target receiver of the third radio signal.

In one embodiment, take the fourth radio signal as an example in Case B in FIG. 8, for the first radio signal, the second radio signal set, the third radio signal, the fourth radio signal, the fifth radio signal, the sixth radio signal, the seventh radio signal, the eighth radio signal, the ninth radio signal, the tenth radio signal, the eleventh radio signal and the twelfth radio signal in the present disclosure, descriptions about above transmitters and target receivers of radio signals are also applicable, hence no further details given here.

Embodiment 9

Figure 9:
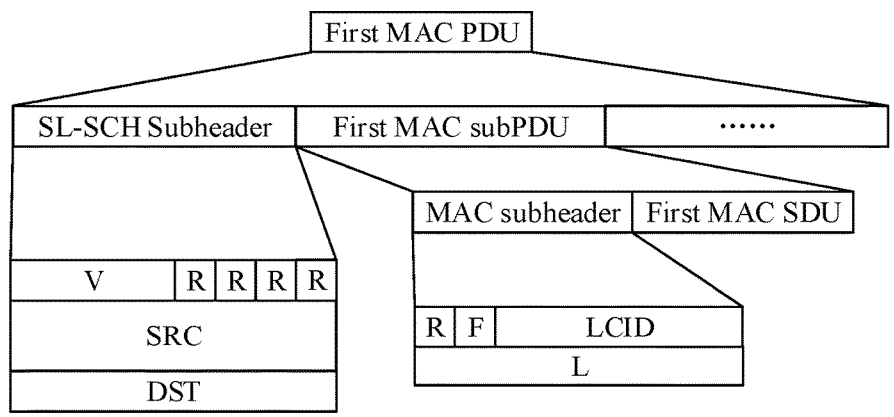
FIG. 9 illustrates a format diagram of a first MAC SDU and a first MAC PDU according to one embodiment of the present disclosure.

Embodiment 9 illustrates a format diagram of a first MAC SDU and a first MAC PDU according to one embodiment of the present disclosure, as shown in FIG. 9.

In one embodiment, the eleventh radio signal comprises a first MAC PDU, as shown in FIG. 9, the first MAC PDU comprises a SL-SCH subheader and a first MAC subPDU, the first MAC subPDU comprising a MAC subheader and the first MAC SDU; a V field comprised by a SL-SCH subheader is used for indicating a version number; an R field comprised by the SL-SCH subheader is a reserved field; a SRC field comprised by the SL-SCH subheader comprises higher 16 bits in a node ID of a transmitter of the eleventh radio signal; a DST field comprised by the SL-SCH subheader comprises higher 8 bits in a node ID of a target receiver of the eleventh radio signal; an R field comprised by the MAC subheader is a reserved field; an F field comprised by the MAC subheader indicates a length contained by an L field comprised by the MAC subheader; an L field comprised by the MAC subheader indicates a number of bytes comprised by the first MAC SDU.

In one embodiment, the MAC subheader comprises an LCD, the LCID being used to indicate a RLC Bearer to which the first MAC SDU belongs.

In one embodiment, the first MAC SDU is distributed to an RLC entity of the third node according to the LCID of the first MAC SDU.

In one embodiment, the first MAC SDU is distributed to the target RLC entity of the first node according to the LCID of the first MAC SDU.

In one embodiment, the first MAC SDU is used by the third node for generating the twelfth radio signal.

In one embodiment, the first MAC subPDU is used by the third node for generating the twelfth radio signal.

In one embodiment, the RLC entity of the third node buffers the first MAC SDU.

In one embodiment, the RLC entity of the third node buffers the first MAC subPDU.

In one embodiment, the LCIDs of the first MAC SDUs respectively comprised by the eleventh radio signal and the twelfth radio signal are the same.

In one embodiment, any MAC PDU corresponding to any MAC SDU in the first MAC SDU set comprises at least part of bits in the node ID of a transmitter of the said MAC PDU.

In one embodiment, any MAC PDU corresponding to any MAC SDU in the first MAC SDU set comprises at least part of bits in the node ID of a receiver of the said MAC PDU.

Embodiment 10

Figure 10:
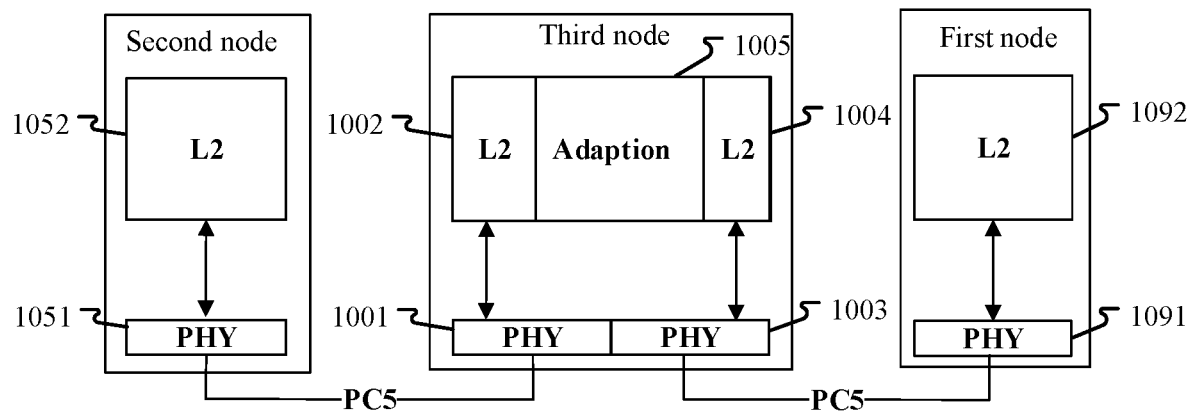
FIG. 10 illustrates a schematic diagram of a radio protocol architecture of user planes of a first node, a second node and a third node according to one embodiment of the present disclosure.

Embodiment 10 illustrates a schematic diagram of a radio protocol architecture of user planes of a first node, a second node and a third node according to one embodiment of the present disclosure, as shown in FIG. 10.

In one embodiment, a PHY layer 1001 and a PHY layer 1003 comprised by the third node, a PHY layer 1051 comprised by the second node and a PHY layer 1091 comprised by the first node comprise the PHY 351 in the user plane 350 in FIG. 3 of the present disclosure.

In one embodiment, a L2 1052 comprised by the second node and a L2 layer 1092 comprised by the first node respectively comprise the MAC sublayer 352, the RLC sublayer 353, the PDCP sublayer 354 and the SDAP sublayer 356 in the L2 355.

In one embodiment, a L2 1002 comprised by the third node comprises a MAC sublayer 352 in the L2 355 comprised in the user plane in FIG. 3 of the present disclosure.

In one embodiment, the L2 1002 comprised by the third node comprises an RLC sublayer 353 in the L2 355 comprised in the user plane in FIG. 3 of the present disclosure; the RLC sublayer in the L2 1002 comprised by the third node performs ARQ retransmission, duplicate packet checking and protocol error detection to the RLC sublayer in the L2 1052 comprised by the second node; the RLC sublayer in the L2 1002 comprised by the third node drops performing packet segmentation and reassembling on the RLC sublayer in the L2 1052 comprised by the second node.

In one embodiment, a L2 1004 comprised by the third node comprises a MAC sublayer 352 in the L2 355 comprised in the user plane in FIG. 3 of the present disclosure.

In one embodiment, the L2 1004 comprised by the third node comprises an RLC sublayer 353 in the L2 355 comprised in the user plane in FIG. 3 of the present disclosure; the RLC sublayer in the L2 1004 comprised by the third node performs ARQ retransmission, duplicate packet checking and protocol error detection to the RLC sublayer in the L2 1092 comprised by the first node; the RLC sublayer in the L2 1004 comprised by the third node drops performing packet segmentation and reassembling on the RLC sublayer in the L2 1092 comprised by the first node.

In one embodiment, the third node comprises an adaptation sublayer 905; the adaptation sublayer in charge of relay-related control plane functionality.

In one embodiment, the adaptation sublayer 1005 is located below or above any protocol sublayer in the L2 1002 and the L2 1004 comprised by the third node.

In one embodiment, the adaptation sublayer 1005 is located above an RLC sublayer in the L2 1002 and an RLC sublayer in the L2 1004 comprised by the first node.

In one embodiment, the third node and the second node being connected via a PC5 interface, the PHY 1001 comprised by the third node correspond to the PHY layer 1051 comprised by the second node.

In one embodiment, the third node and the first node being connected via a PC5 interface, the PHY 1003 comprised by the third node correspond to the PHY layer 1091 comprised by the first node.

In one embodiment, the first MAC SDU set is generated by the L2 1052 comprised by the second node.

In one embodiment, the first MAC SDU set is received by the L2 1092 comprised by the first node.

In one embodiment, the first MAC SDU is buffered in the L2 1002 comprised by the third node.

In one embodiment, the first MAC SDU is buffered in the L2 1004 comprised by the third node.

In one embodiment, the third node buffers the first MAC SDU received in the L2 1002; when the third node transmits a control message to the second node to indicate successful reception of the first MAC SDU, the first MAC SDU is delivered by the L2 1002 to the L2 1004.

In one embodiment, the third node buffers the first MAC SDU received in the L2 1002; when scheduling the first MAC SDU to be transmitted to the first node, the first MAC SDU is delivered by the L2 1002 to the L2 1004.

In one embodiment, the second parameter set comprises configuration parameters for the L2 1002 and the L2 1004.

Embodiment 11

Figure 11:
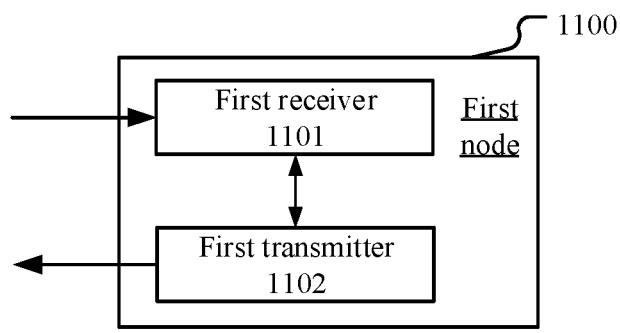
FIG. 11 illustrates a structure block diagram of a processing device in a first node according to one embodiment of the present disclosure.

Embodiment 11 illustrates a structure block diagram of a processing device in a first node according to one embodiment of the present disclosure, as shown in FIG. 11. In FIG. 11, a first node's processing device 1100 comprises a first receiver 1101 and a first transmitter 1102. The first receiver 1101 comprises at least one of the transmitter/receiver 454 (comprising the antenna 452), the receiving processor 456, the multi-antenna receiving processor 458 or the controller/processor 459 in FIG. 4 of the present disclosure; the first transmitter 1102 comprises at least one of the transmitter/receiver 454 (comprising the antenna 452), the transmitting processor 468, the multi-antenna transmitting processor 457 or the controller/processor 459 in FIG. 4 of the present disclosure.

In Embodiment 11, the first receiver 1101 receives a third radio signal and a first radio signal set in step 101, the third radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC SDU set, and the first parameter set is applicable to the first MAC SDU set.

In one embodiment, the first transmitter 1102 transmits a fifth radio signal as a response to the first information, the fifth radio signal comprising second information; herein, a target receiver of the fifth radio signal is a transmitter of the third radio signal.

In one embodiment, the first receiver 1101 monitors a corresponding physical layer signaling for each node ID of the Q node IDs in a first time-frequency resource pool; herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

In one embodiment, the first transmitter 1102 transmits third information, the third information comprising a discovery message; the first receiver 1101 receives a fourth information set, and determines P candidate node IDs according to the fourth information set; the first transmitter 1102 transmits a seventh radio signal, the seventh radio signal comprising fifth information, the fifth information comprising the P candidate node IDs; herein, any piece of information in the fourth information set comprises a response to the third information; the P candidate node IDs comprise the Q node IDs; P is a positive integer no less than Q.

In one embodiment, the first transmitter 1102 determines a first radio link failure; and as a response to the first radio link failure, transmits a ninth radio signal, the ninth radio signal comprising sixth information, the sixth information indicating the first radio link failure; herein, the Q node IDs comprise a first node ID; the first radio link comprises a node identified by the first node ID; a target receiver of the ninth radio signal comprises a node identified by one of the Q node IDs other than the first node ID.

In one embodiment, the first receiver 1101, for any MAC SDU comprised by the first MAC SDU set, distributes the MAC SDU to a target RLC entity of the first node according to a LCD of the MAC SDU; herein, the target RLC entity of the first node is unrelated to a node ID of a transmitter of the MAC SDU.

Embodiment 12

Figure 12:
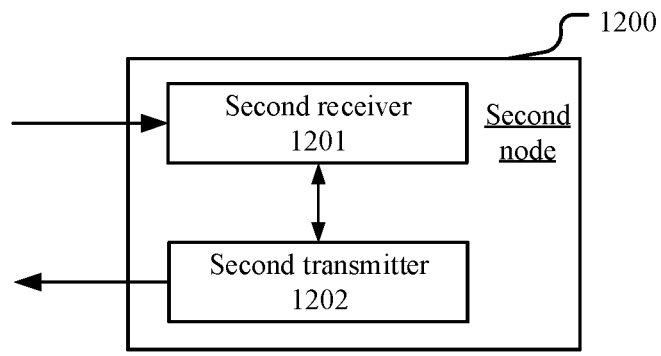
FIG. 12 illustrates a structure block diagram of a processing device in a second node according to one embodiment of the present disclosure.

Embodiment 12 illustrates a structure block diagram of a processing device in a second node according to one embodiment of the present disclosure, as shown in FIG. 12. In FIG. 12, a second node's processing device 1200 comprises a second receiver 1201 and a second transmitter 1202. The second receiver 1201 comprises at least one of the transmitter/receiver 554 (comprising the antenna 552), the receiving processor 556, the multi-antenna receiving processor 558 or the controller/processor 559 in FIG. 5 of the present disclosure; the second transmitter 1202 comprises at least one of the transmitter/receiver 554 (comprising the antenna 552), the transmitting processor 568, the multi-antenna transmitting processor 557 or the controller/processor 559 in FIG. 5 of the present disclosure.

In Embodiment 12, the second transmitter 1202 transmits a fourth radio signal and a second radio signal set, the fourth radio signal comprising first information; herein, the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC SDU set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q In one embodiment, the second receiver 1201 receives a sixth radio signal, the sixth radio signal comprising second information; herein, the second information comprises a response to the first information; a transmitter of the sixth radio signal is a target receiver of the fourth radio signal.

In one embodiment, a corresponding physical layer signaling for each node ID of the Q node IDs is monitored in a first time-frequency resource pool; herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

In one embodiment, the second receiver 1201 receives an eighth radio signal, the eighth radio signal comprising fifth information, the fifth information comprising P candidate node IDs; herein, the P candidate node IDs comprise the Q node IDs; P is a positive integer no less than Q.

In one embodiment, the second receiver 1201 receives a tenth radio signal, the tenth radio signal comprising sixth information; herein, the sixth information indicates a first radio link failure; the Q node IDs comprise a first node ID; the first radio link comprises a node identified by the first node ID; a transmitter of the tenth radio signal comprises a node identified by one of the Q node IDs other than the first node ID.

In one embodiment, any MAC SDU comprised by the first MAC SDU set is from an RLC entity of the second node, any two said MAC SDUs share a same LCID; herein, the RLC entity of the second node is unrelated to a node ID of a receiver of the MAC SDU.

In one embodiment, the second transmitter 1202 transmits an eighth information set, the eighth information set comprising a second configuration, the second configuration comprising a second parameter set; herein, the second parameter set is used for configuring RLC Bearers for Q nodes identified by the Q node IDs.

Embodiment 13

Figure 13:
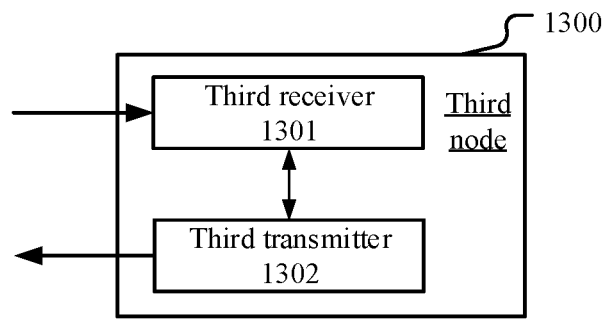
FIG. 13 illustrates a structure block diagram of a processing device in a third node according to one embodiment of the present disclosure.

Embodiment 13 illustrates a structure block diagram of a processing device in a third node according to one embodiment of the present disclosure, as shown in FIG. 13. In FIG. 13, a third node's processing device 1300 comprises a third receiver 1301 and a third transmitter 1302. The third receiver 1301 comprises at least one of the transmitter/receiver 418 (comprising the antenna 420), the receiving processor 470, the multi-antenna receiving processor 472 or the controller/processor 475 in FIG. 4 of the present disclosure; the third transmitter 1302 comprises at least one of the transmitter/receiver 418 (comprising the antenna 420), the transmitting processor 416, the multi-antenna transmitting processor 471 or the controller/processor 475 in FIG. 4 of the present disclosure.

In Embodiment 13, the third receiver 1301 receives a fourth radio signal and an eleventh radio signal, the eleventh radio signal belonging to a second radio signal set; the third transmitter 1302 transmits a third radio signal and a twelfth radio signal, the twelfth radio signal belonging to a first radio signal set; herein, the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC SDU set, and the first parameter set is applicable to the first MAC SDU set.

In one embodiment, the third receiver 1301 receives a fifth radio signal; the third transmitter 1302 transmits a sixth radio signal; herein, the fifth radio signal and the sixth radio signal respectively comprise second information; the second information comprises a response to the first information.

In one embodiment, a corresponding physical layer signaling for each node ID of the Q node IDs is monitored in a first time-frequency resource pool; herein, Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

In one embodiment, the third receiver 1301 receives third information and a seventh radio signal, the third information comprising a discovery message; transmits seventh information and an eighth radio signal, the seventh information belonging to a fourth information set; herein, the fourth information set is used for determining P candidate node IDs; the seventh information comprises a response to the third information; the seventh radio signal and the eighth radio signal respectively comprise fifth information, the fifth information comprising the P candidate node IDs; the P candidate node IDs comprise the Q node IDs; P is a positive integer no less than Q.

In one embodiment, the third receiver 1301 receives a ninth radio signal; and the third transmitter 1302 transmits a tenth radio signal; herein, the ninth radio signal and the tenth radio signal respectively comprise sixth information, the sixth information indicating a first radio link failure; the Q node IDs comprise a first node ID; the first radio link comprises a node identified by the first node ID; the third node is a node identified by one of the Q node IDs other than the first node ID.

In one embodiment, for a first MAC SDU comprised by the eleventh radio signal, the first MAC SDU is distributed to an RLC entity of the third node according to an LCD of the first MAC SDU; the first MAC SDU is used for generating the twelfth radio signal; herein, the RLC entity of the third node buffers the first MAC SDU; the first MAC SDU belongs to the first MAC SDU set.

In one embodiment, the third receiver 1301 receives ninth information, the ninth information belonging to an eighth information set; the ninth information comprising a second configuration, the second configuration comprising a second parameter set; herein, the second parameter set is used for configuring a RLC Bearers for the third node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first-type communication node or UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second-type communication node or base station or system device in the present disclosure includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a third radio signal and a first radio signal set, the third radio signal comprising first information;
wherein the first information comprises a node ID group and a first configuration; the node ID group comprises Q node IDs, Q being a positive integer greater than 1; the first configuration comprises a first parameter set; one of the Q node IDs is used for identifying a transmitter of the third radio signal; the first parameter set is used for configuring a Radio Bearer for the first node; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q; the first radio signal set comprises a first MAC (Medium Access Control) SDU (Service Data Unit) set, and the first parameter set is applicable to the first MAC SDU set.

2. The first node according to claim 1, comprising:
a first transmitter, transmitting a fifth radio signal as a response to the first information, the fifth radio signal comprising second information;
wherein a target receiver of the fifth radio signal is a transmitter of the third radio signal.

3. The first node according to claim 1, comprising:
the first receiver, monitoring a corresponding physical layer signaling for each node ID of the Q node IDs in a first time-frequency resource pool;
wherein Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

4. The first node according to claim 1, comprising:
the first transmitter, transmitting third information, the third information comprising a discovery message;
the first receiver, receiving a fourth information set, and determining P candidate node IDs according to the fourth information set;
the first transmitter, transmitting a seventh radio signal, the seventh radio signal comprising fifth information, the fifth information comprising the P candidate node IDs;
wherein any piece of information in the fourth information set comprises a response to the third information; the P candidate node IDs comprise the Q node IDs; P is a positive integer no less than Q.

5. The first node according to claim 1, comprising:
the first transmitter, determining a first radio link failure; and as a response to the first radio link failure, transmitting a ninth radio signal, the ninth radio signal comprising sixth information, the sixth information indicating the first radio link failure;
wherein the Q node IDs comprise a first node ID; the first radio link comprises a node identified by the first node ID; a target receiver of the ninth radio signal comprises a node identified by one of the Q node IDs other than the first node ID.

6. The first node according to claim 1, comprising:
the first receiver, for any MAC SDU comprised by the first MAC SDU set, distributing the MAC SDU to a target RLC (Radio Link Control) entity of the first node according to a LCID (Logical Channel IDentity) of the MAC SDU;
wherein the target RLC entity of the first node is unrelated to a node ID of a transmitter of the MAC SDU.

7. A second node for wireless communications, comprising:
a second transmitter, transmitting a fourth radio signal and a second radio signal set, the fourth radio signal comprising first information;
wherein the first information comprises a node ID group and a first configuration; the node ID group comprises Q node IDs, Q being a positive integer greater than 1; the first configuration comprises a first parameter set; one of the Q node IDs is used for identifying a target receiver of the fourth radio signal; the second radio signal set comprises a first MAC (Medium Access Control) SDU (Service Data Unit) set, the first MAC SDU set being used to generate a first radio signal set; the first parameter set is used for configuring a Radio Bearer for a target receiver of the first MAC SDU set, and the first parameter set is applicable to the first MAC SDU set; a transmitter of the first radio signal set is identified by one of the Q node IDs, or transmitters of Q1 radio signals in the first radio signal set are respectively identified by Q1 node IDs of the Q node IDs, Q1 being a positive integer greater than 1 and no greater than the Q.

8. The second node according to claim 7, comprising:
a second receiver, receiving a sixth radio signal, the sixth radio signal comprising second information;
wherein the second information comprises a response to the first information; a transmitter of the sixth radio signal is a target receiver of the fourth radio signal.

9. The second node according to claim 7, wherein a corresponding physical layer signaling for each node ID of the Q node IDs is monitored in a first time-frequency resource pool;
wherein Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

10. The second node according to claim 7, comprising:
the second receiver, receiving an eighth radio signal, the eighth radio signal comprising fifth information, the fifth information comprising P candidate node IDs;
wherein the P candidate node IDs comprise the Q node IDs; P is a positive integer no less than Q.

11. The second node according to claim 7, comprising:
the second receiver, receiving a tenth radio signal, the tenth radio signal comprising sixth information;
wherein the sixth information indicates a first radio link failure; the Q node IDs comprise a first node ID; the first radio link comprises a node identified by the first node ID; a transmitter of the tenth radio signal comprises a node identified by one of the Q node IDs other than the first node ID.

12. The second node according to claim 7, wherein any MAC SDU comprised by the first MAC SDU set is from an RLC (Radio Link Control) entity of the second node, any two said MAC SDUs share a same LCID (Logical Channel IDentity);
  wherein the RLC entity of the second node is unrelated to a node ID of a receiver of the MAC SDU.

13. The second node according to claim 7, comprising:
  the second transmitter, transmitting an eighth information set, the eighth information set comprising a second configuration, the second configuration comprising a second parameter set;
  wherein the second parameter set is used for configuring RLC (Radio Link Control) Bearers for Q nodes identified by the Q node IDs.

14. A third node for wireless communications, comprising:
  a third receiver, receiving a fourth radio signal and an eleventh radio signal, the eleventh radio signal belonging to a second radio signal set;
  a third transmitter, transmitting a third radio signal and a twelfth radio signal, the twelfth radio signal belonging to a first radio signal set;
  wherein the third radio signal and the fourth radio signal respectively comprise first information, the first information comprising a node ID group and a first configuration; the node ID group comprises Q node IDs, Q being a positive integer greater than 1; the first configuration comprises a first parameter set; the first parameter set is used for configuring a Radio Bearer for a target receiver of the twelfth radio signal; the third node is identified by one of the Q node IDs, or transmitters of Q1 radio signals in the first radio signal set are respectively identified by Q1 node IDs of the Q node IDs and the third node is identified by one of the Q1 node IDs, Q1 being a positive integer greater than 1 and no greater than the Q; the first radio signal set and the second radio signal set respectively comprise a first MAC (Medium Access Control) SDU (Service Data Unit) set, and the first parameter set is applicable to the first MAC SDU set.

15. The third node according to claim 14, comprising:
  the third receiver, receiving a fifth radio signal;
  the third transmitter, transmitting a sixth radio signal;
  wherein the fifth radio signal and the sixth radio signal respectively comprise second information; the second information comprises a response to the first information.

16. The third node according to claim 14, wherein a corresponding physical layer signaling for each node ID of the Q node IDs is monitored in a first time-frequency resource pool;
  wherein Q2 physical layer signaling(s) is(are) detected, the first radio signal set comprises Q2 radio signal(s), and the Q2 physical layer signaling(s) comprises (respectively comprise) scheduling information of the Q2 radio signal(s), Q2 being a positive integer.

17. The third node according to claim 14, comprising:
  the third receiver, receiving third information and a seventh radio signal, the third information comprising a discovery message;
  the third transmitter, transmitting seventh information and an eighth radio signal, the seventh information belonging to a fourth information set;
  wherein the fourth information set is used for determining P candidate node IDs; the seventh information comprises a response to the third information; the seventh radio signal and the eighth radio signal respectively comprise fifth information, the fifth information comprising the P candidate node IDs; the P candidate node IDs comprise the Q node IDs; P is a positive integer no less than Q.

18. The third node according to claim 14, comprising:
  the third receiver, receiving a ninth radio signal; and
  the third transmitter, transmitting a tenth radio signal;
  wherein the ninth radio signal and the tenth radio signal respectively comprise sixth information, the sixth information indicating a first radio link failure; the Q node IDs comprise a first node ID; the first radio link comprises a node identified by the first node ID; the third node is a node identified by one of the Q node IDs other than the first node ID.

19. The third node according to claim 14, wherein the eleventh radio signal comprises a first MAC SDU, the first MAC SDU being distributed to an RLC (Radio Link Control) entity of the third node according to an LCID (Logical Channel IDentity) of the first MAC SDU; the first MAC SDU is used for generating the twelfth radio signal;
  wherein the RLC entity of the third node buffers the first MAC SDU; the first MAC SDU belongs to the first MAC SDU set.

20. The third node according to claim 14, comprising:
  the third receiver, receiving ninth information, the ninth information belonging to an eighth information set; the ninth information comprising a second configuration, the second configuration comprising a second parameter set;
  wherein the second parameter set is used for configuring RLC (Radio Link Control)
  Bearers for the third node.

* * * * *